(12) United States Patent
Ma et al.

(10) Patent No.: US 12,498,997 B2
(45) Date of Patent: Dec. 16, 2025

(54) SYSTEM ARCHITECTURE FOR IMPLEMENTING DDS COMMUNICATION BASED ON AUTOSAR, COMMUNICATION METHOD, AND DEVICE

(71) Applicant: Shenzhen Yinwang Intelligent Technologies Co., Ltd., Shenzhen (CN)

(72) Inventors: Songjun Ma, Hangzhou (CN); Bin Jiang, Shenzhen (CN); Zhenfei Li, Shanghai (CN); Yanqin Xu, Shanghai (CN); Zhenqiang Kong, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 239 days.

(21) Appl. No.: 18/492,446

(22) Filed: Oct. 23, 2023

(65) Prior Publication Data

US 2024/0045657 A1 Feb. 8, 2024

Related U.S. Application Data

(63) Continuation of application No. PCT/CN2022/087550, filed on Apr. 19, 2022.

(30) Foreign Application Priority Data

Apr. 22, 2021 (CN) .......................... 202110435762.4
Jun. 25, 2021 (CN) .......................... 202110714858.4

(51) Int. Cl.
*G06F 8/70* (2018.01)
*G06F 8/20* (2018.01)
(Continued)

(52) U.S. Cl.
CPC ................ *G06F 9/546* (2013.01); *G06F 8/20* (2013.01); *G06F 8/30* (2013.01); *H04L 41/0886* (2013.01);
(Continued)

(58) Field of Classification Search
CPC ... G05D 1/0022; H04L 12/2827; H04L 69/18; H04L 12/4013; G06F 9/546
See application file for complete search history.

(56) References Cited

U.S. PATENT DOCUMENTS 10,681,184 B2 6/2020 Wagner et al.
2006/0146991 A1* 7/2006 Thompson .............. H04L 69/18
379/67.1

(Continued)

FOREIGN PATENT DOCUMENTS

CN 110209514 A 9/2019
CN 112230630 A 1/2021

OTHER PUBLICATIONS

Arestova et al., "A Service-Oriented Real-Time Communication Scheme for AUTOSAR Adaptive Using OPC UA and Time-sensitive Networking",—Mar. 27, 2021, 29 pgs <AutoSar_032721. pdf>.*

(Continued)

*Primary Examiner* — Tuan A Vu
(74) *Attorney, Agent, or Firm* — Leydig, Voit & Mayer, Ltd.

(57) ABSTRACT

This application discloses a system architecture for implementing data distribution service (DDS) communication based on an automotive open system architecture (AUTOSAR), a communication method, and a device that may be applied to an intelligent agent (for example, an intelligent vehicle, an intelligent connected vehicle, or an autonomous vehicle) in intelligent driving.

20 Claims, 24 Drawing Sheets

(51) Int. Cl.
  *G06F 8/30* (2018.01)
  *G06F 9/54* (2006.01)
  *H04L 41/08* (2022.01)
  *H04W 4/12* (2009.01)
  *G05D 1/22* (2024.01)
  *H04L 12/28* (2006.01)
  *H04L 12/40* (2006.01)
  *H04L 69/18* (2022.01)

(52) U.S. Cl.
  CPC ............... *H04W 4/12* (2013.01); *G05D 1/22* (2024.01); *G06F 2209/547* (2013.01); *H04L 12/2827* (2013.01); *H04L 12/4013* (2013.01); *H04L 69/18* (2013.01)

(56) References Cited

U.S. PATENT DOCUMENTS

| | | | | |
|---|---|---|---|---|
| 2013/0054863 | A1* | 2/2013 | Imes | H04L 12/2827 709/223 |
| 2013/0212659 | A1* | 8/2013 | Maher | G05D 1/0022 726/6 |
| 2021/0006514 | A1* | 1/2021 | Shen | H04L 12/4013 |

OTHER PUBLICATIONS

Tian et al., CN 110248351, (translation)—Sep. 17, 2019, 16 pgs <CN_110248351.pdf>.*

"Automotive Open System Architecture," China Society of Automotive Engineers, [online], https://baike.baidu.com/item/%E6%B1%BD%E8%BD%A6%E5%BC%80%E6%94%BE%E7%B3%BB%E7%BB%9F%E6%9E%B6%E6%9E%84/17038680?fromtitle=AUTOSARandfromid=8457754, Baidu Encyclopedia, Total 5 pages (Last update Sep. 2022). With an English Abstract.

"AUTOSAR-RTE(1) Basic Concepts," chrihop, [online], https://www.cnblogs.com/autosar/archive/2010/03/17/1687821.html, cnblogs, Total 13 pages (Mar. 2010). With an English Abstract.

"Object Management Group," Wikipedia, [online], https://zh.wikipedia.org/wiki/%E5%AF%B9%E8%B1%A1%E7%AE%A1%E7%90%86%E7%BB%84%E7%BB%87, Total 4 pages (Last edited Sep. 2021). With an English Abstract.

"High-level architecture," Changxiangqiannian, [online], https://baike.baidu.com/item/HLA/16707923, baidu baike, Total 9 pages (Last update Jan. 2022). With an English Abstract.

"Public object request proxy architecture," Shiyuxin, [online], https://baike.baidu.com/item/%E5%85%AC%E5%85%B1%E5%AF%B9%E8%B1%A1%E8%AF%B7%E6%B1%82%E4%BB%A3%E7%90%86%E4%BD%93%E7%B3%BB%E7%BB%93%E6%9E%84, baidu baike, Total 11 pages (last update on Aug. 2024).

"Qos," CICC, [online], https://baike.baidu.com/item/qos?fromtitle=%E6%9C%8D%E5%8A%A1%E8%B4%A8%E9%87%8Fandfromid=9401950, Baidu Encyclopedia, total 43 pages (Last update on Dec. 13, 2021). With an English Abstract.

"Serialization," Wiki, [online] https://zh.wikipedia.org/wiki/%E5%BA%8F%E5%88%97%E5%8C%96, wikipedia, Total 11 pages (Last edited Oct. 2024).

"Portable operating system interfaces," Encyclopedia user HLqR6u, [online], https://baike.baidu.com/item/%E5%8F%AF%E7%A7%BB%E6%A4%8D%E6%93%8D%E4%BD%9C%E7%B3%BB%E7%BB%9F%E6%8E%A5%E5%8F%A3?fromtitle=POSIXandfromid=3792413, baidu baike, Total 6 pages (last update on Jan. 8, 2022). With an English Translation.

"Carefully organize the recommended AUTOSAR science introduction materials for vomiting blood," leon1741, [online], https://blog.csdn.net/LEON1741/article/details/105847992, CSDN, total 6 pages (Apr. 2020). With an English Abstract.

"Data Distribution Service (DDS)," [online], https://baike.sogou.com/v83117448.htm?ch=zhihu.topic, Total 2 pages (Dec. 2018).

Arestova et al., "A Service-Oriented Real-Time Communication Scheme for AUTOSAR Adaptive Using OPC UA and Time-Sensitive Networking," Sensors, vol. 21, No. 7, MDPI, Total 29 pages (Mar. 27, 2021).

* cited by examiner

SYSTEM ARCHITECTURE FOR IMPLEMENTING DDS COMMUNICATION BASED ON AUTOSAR, COMMUNICATION METHOD, AND DEVICE

CROSS-REFERENCE TO RELATED APPLICATION

This application is a continuation of International Application No. PCT/CN2022/087550, filed on Apr. 19, 2022, which claims priority to Chinese Patent Application No. 202110714858.4, filed on Jun. 25, 2021 and Chinese Patent Application No. 202110435762.4, filed on Apr. 22, 2021. All of the aforementioned patent applications are hereby incorporated by reference in their entireties.

TECHNICAL FIELD

This application relates to the field of in-vehicle management technologies, and in particular, to a system architecture for implementing data distribution service (DDS) communication based on automotive open system architecture (AUTOSAR), a communication method, and a device.

BACKGROUND

Automotive open system architecture (AUTOSAR) is a standard protocol jointly established by global automobile OEMs, component suppliers, and automotive electronics software companies. The protocol specifies an open and standardized software architecture that complies with automotive electronics software development. An initial AUTOSAR specification only considers a conventional automotive electronic and electrical architecture, and a definite function is provided based on a scenario in which hardware computing power is limited. This is known as classic AUTOSAR, or classic protocol (CP) for short. In various technical documents, "AUTOSAR" usually refers specifically to CP. Currently, most vendors around the world develop software based on an AUTOSAR architecture.

With rapid evolution of vehicles toward intelligence, various intelligent networking technologies and autonomous driving technologies are being rapidly updated. Various devices on vehicles are increasing explosively, and software requirements are becoming increasingly high. A distributed automotive electronic and electrical architecture is gradually evolving into a function-domain centralized architecture or a central centralized architecture. The conventional AUTOSAR specification is no longer suitable for current development of vehicle electronics. Therefore, an adaptive automotive open system architecture (AP) has been developed. The AP is mainly configured to carry an intelligent software module, and is deployed on a hardware resource with stronger computing power. For various sensors, actuators, or other function components deployed on a vehicle, some hardware still needs a CP software architecture due to a limited hardware capability.

It is specified that an AUTOSAR (that is, classic AUTOSAR, CP)-based CP device uses only SOME/IP (which is a type of communication middleware) for communication, but an adaptive AUTOSAR (that is, AP)-based AP device may use DDS (which is also a type of communication middleware) and SOME/IP for communication. Therefore, the CP device can communicate with only an application that uses SOME/IP in the AP device, but cannot communicate with an application that uses DDS in the AP device. A current solution is to implement a basic function of a data distribution service (DDS) in a CDD in a CP software architecture. The CDD is configured to carry a function module beyond a CP specification. However, this approach changes a conventional habit that a CP user performs automatic development by using tools. A developer needs to manually add and modify a large amount of code to use various DDS interfaces, and a capability of performing service-oriented communication with the AP device cannot be implemented.

SUMMARY

Embodiments of this application provide a system architecture for implementing DDS communication based on AUTOSAR, a communication method, and a device, to integrate a DDS into BSW in a CP software architecture, so that the DDS is compatible with a CP, and a software component (SWC) is unaware of modification of underlying software.

Based on this, embodiments of this application provide the following technical solutions.

According to a first aspect, an embodiment of this application first provides a system architecture for implementing DDS communication based on AUTOSAR, which may be used in an in-vehicle management technology. The system architecture includes at least one first integrated module, a DDS architecture, and an AUTOSAR. The first integrated module is constructed in the DDS architecture, and the DDS architecture is deployed in basic software (BSW) in the AUTOSAR. In addition, the AUTOSAR further includes a runtime environment (RTE) and at least one SWC. The first integrated module is configured to manage a message publisher and/or a message subscriber, for example, configured to manage an automatic discovery process between the message publisher and the message subscriber. For another example, when pairing between one or more message publishers and one or more message subscribers is completed, the first integrated module manages data in the message publisher and/or the message subscriber. A specific management manner is not limited in this application. The RTE in the AUTOSAR is configured to store a mapping relationship between each first integrated module and a corresponding SWC signal. It should be noted that the SWC signal is a signal sent by the SWC to the RTE and provided for the DDS architecture.

In the foregoing implementation of this application, a new system architecture is provided. In the system architecture, a DDS is integrated into BSW in a CP software architecture, and the message publisher and/or the message subscriber are/is managed by using the first integrated module, so that the DDS is compatible with a CP, and the SWC is unaware of modification of underlying software.

In a possible implementation of the first aspect, the first integrated module may be configured to manage an automatic discovery process between a message publisher and a message subscriber. Specifically, in this implementation, the first integrated module may be specifically configured to: determine a status of pairing between at least one message publisher and at least one message subscriber, for example, a status of pairing between m message publishers and n message subscribers, based on an automatic discovery mechanism of the DDS architecture; and when pairing between the at least one message publisher and the at least one message subscriber is completed, for example, the m message publishers are paired with the n message subscribers, manage data in the at least one message publisher and/or the at least one message subscriber.

In the foregoing implementation of this application, how the first integrated module is configured to manage the automatic discovery process between the message subscriber and the message publisher is specifically described, and this is implementable.

In a possible implementation of the first aspect, in addition to managing the automatic discovery process between the message publisher and the message subscriber, the first integrated module may also be configured to manage data between the message publisher and the message subscriber after the automatic discovery process ends. Specifically, for response/request-based sent data of the SWC, an implementation may be as follows: The first integrated module is specifically configured to: first obtain a target SWC signal from the RTE; then determine, based on the target SWC signal, a target message publisher corresponding to the target SWC signal, where the target message publisher is one of the at least one message publisher, for example, one of the m message publishers; and instruct the target message publisher to send first target data from a target SWC (that is, to-be-sent data of the target SWC) to a target message subscriber (that is, a receive end of the first target data). The target SWC is an SWC corresponding to the target SWC signal and is an SWC deployed on the AUTOSAR. The target message subscriber is one of the at least one message subscriber, for example, one of the n message subscribers.

In the foregoing implementation of this application, it is specifically described that in addition to managing the automatic discovery process between the message publisher and the message subscriber, the first integrated module may also be configured to manage the data between the message publisher and the message subscriber after the automatic discovery process ends. This application specifically describes how the first integrated module is configured to manage response/request-based sent data of the target SWC, and is flexible.

In a possible implementation of the first aspect, for response/request-based received data of the SWC, an implementation may be as follows: The first integrated module is further specifically configured to: receive a first instruction sent by a target message subscriber, where the first instruction represents that the target message subscriber has obtained second target data sent by a target message publisher (that is, a data transmit end), the target message publisher is one of the at least one message publisher, for example, one of the m message publishers, and the target message subscriber is one of the at least one message subscriber, for example, one of the n message subscribers; and then instruct, based on the first instruction, the RTE to obtain the second target data, for the target SWC to use the second target data on the RTE. It should be noted herein that the second target data is not directly sent to the target SWC, but is received by the RTE. When the target SWC needs to use the second target data, the second target data is used through calling.

In the foregoing implementation of this application, it is specifically described that in addition to managing the automatic discovery process between the message publisher and the message subscriber, the first integrated module may also be configured to manage the data between the message publisher and the message subscriber after the automatic discovery process ends. This application specifically describes how the first integrated module is configured to manage response/request-based received data of the target SWC, and is flexible.

In a possible implementation of the first aspect, the first integrated module may be further configured to: after obtaining the first instruction sent by the target message subscriber, store identification information of a message subscriber (for example, Sub3) corresponding to the target message publisher (for example, Pub3). The identification information may be an address of the message subscriber, or may be a field corresponding to the message subscriber, and any information that can uniquely identify the message subscriber may be referred to as the identification information in this application. A type of the identification information is not limited herein. Alternatively, the first integrated module may be further configured to send the identification information to the RTE, and the RTE stores the identification information.

In the foregoing implementation of this application, it is specifically described that when the first integrated module is configured to manage the response/request-based received data of the target SWC, the first integrated module may be configured to store the identification information of the message subscriber corresponding to the target message publisher, or send the identification information to the RTE, for the RTE to store the identification information. An objective of storing the identification information is that when the target SWC feeds back data, no pairing search is required, and a specific message subscriber with feedback to be sent to can be directly determined, thereby reducing a delay.

In a possible implementation of the first aspect, the system architecture may further include a target module (for example, a DDS-SD module). The target module is embedded in a BSW management unit (BSW-M) in the BSW, and the target module is configured to manage an exchange process of a simple participant discovery protocol (SPDP) message and/or a simple endpoint discovery protocol (SEDP) message corresponding to each participant (for example, uniformly manage behavior, a parameter, and the like of each participant). The exchange process is used to implement the automatic discovery mechanism of the DDS architecture.

In the foregoing implementation of this application, the target module is embedded in the BSW-M in the BSW to resolve a service discovery problem, and automatic discovery of the DDS architecture is implemented by using the embedded target module. This is implementable.

In a possible implementation of the first aspect, the system architecture may further include a code generation module, configured to: generate a code snippet from SPDP information and/or SEDP information corresponding to each participant, and when a first participant is in an automatic discovery process, assemble a code snippet corresponding to the first participant, to form SPDP information and/or SEDP information corresponding to the first participant, where the first participant is one or more participants.

In the foregoing implementation of this application, the code generation module generates the code snippet in advance from the SPDP information and/or the SEDP information corresponding to each participant, and performs assembly during running. In this manner, memory background noise can be reduced, and memory space can be saved.

In a possible implementation of the first aspect, the code generation module may be further configured to store obtained SPDP information and/or SEDP information of a peer end of the first participant as dynamic information, where the dynamic information is temporarily stored information.

In the foregoing implementation of this application, the SPDP information and/or the SEDP information sent by the peer end of the first participant need/needs to be stored as the dynamic information. This is implementable.

In a possible implementation of the first aspect, when a first SWC has a DDS history cache (history cache) requirement, the first SWC meets the DDS history cache requirement by occupying memory space, where the first SWC is one of SWCs deployed in the AUTOSAR.

In the foregoing implementation of this application, for an SWC having a DDS history cache requirement, the SWC is allowed to occupy the memory space. This implements on-demand memory space allocation.

In a possible implementation of the first aspect, when a first SWC does not have a DDS history cache (history cache) requirement, the first SWC occupies memory space by using stack space.

In the foregoing implementation of this application, for an SWC without a DDS history cache requirement, the memory space is directly occupied by using the stack space. This is flexible.

A second aspect of embodiments of this application further provides a method for implementing DDS communication based on AUTOSAR. The method is applied to a system architecture, the system architecture includes at least one first integrated module, a DDS architecture, and an AUTOSAR, the first integrated module is constructed in the DDS architecture, the DDS architecture is deployed in BSW in the AUTOSAR, the AUTOSAR includes an RTE and an SWC, and the method includes: First, the RTE receives a target SWC signal sent by a target SWC deployed in the AUTOSAR, where the target SWC signal is a signal sent by the target SWC to the RTE and provided for the DDS architecture. Then, the RTE determines a target integrated module corresponding to the target SWC signal based on a mapping relationship that is between each first integrated module and a corresponding SWC signal and that is stored in the RTE. The first integrated module is configured to manage a message publisher and/or a message subscriber, for example, configured to manage an automatic discovery process between the message publisher and the message subscriber. For another example, when pairing between one or more message publishers and one or more message subscribers is completed, the first integrated module manages data in the message publisher and/or the message subscriber. A specific management manner is not limited in this application. Finally, the RTE sends the target SWC signal to the target integrated module, and the target integrated module manages a target message publisher and/or a target message subscriber based on the target SWC signal.

In the foregoing implementation of this application, a DDS is integrated into BSW in a CP software architecture, and the message publisher and/or the message subscriber are/is managed by using the first integrated module, so that the DDS is compatible with a CP, and the SWC is unaware of modification of underlying software.

In a possible implementation of the second aspect, the first integrated module may be configured to manage an automatic discovery process between a message publisher and a message subscriber. Specifically, a process in which the first integrated module manages the message publisher and/or the message subscriber may be: determining a status of pairing between at least one message publisher and at least one message subscriber, for example, a status of pairing between m message publishers and n message subscribers, based on an automatic discovery mechanism of the DDS architecture; and when pairing between the at least one message publisher and the at least one message subscriber is completed, for example, the m message publishers are paired with the n message subscribers, managing data in the at least one message publisher and/or the at least one message subscriber.

In the foregoing implementation of this application, how the first integrated module is configured to manage the automatic discovery process between the message subscriber and the message publisher is specifically described, and this is implementable.

In a possible implementation of the second aspect, a process in which the target integrated module manages the target message publisher and/or the target message subscriber based on the target SWC signal may be managing response/request-based sent data of the target SWC. A specific implementation may be as follows: The target integrated module determines, based on the target SWC signal, the target message publisher corresponding to the target SWC signal. The target message publisher is one of the at least one message publisher, for example, one of the m message publishers. Then, the target integrated module instructs the target message publisher to send first target data from the target SWC (that is, to-be-sent data of the target SWC) to the target message subscriber (that is, a receive end of the first target data). The target SWC is an SWC corresponding to the target SWC signal and is an SWC deployed on the AUTOSAR. The target message subscriber is one of the at least one message subscriber, for example, one of the n message subscribers.

In the foregoing implementation of this application, how the target integrated module manages the response/request-based sent data of the target SWC is specifically described. This is flexible.

In a possible implementation of the second aspect, the target integrated module may further manage the target message publisher and/or the target message subscriber for response/request-based received data of the SWC. A specific implementation may be as follows: The target integrated module receives a first instruction sent by the target message subscriber, where the first instruction represents that the target message subscriber has obtained second target data sent by the target message publisher (that is, a data transmit end), the target message publisher is one of the at least one message publisher, for example, one of the m message publishers, and the target message subscriber is one of the at least one message subscriber, for example, one of the n message subscribers. Then, the target integrated module instructs, based on the first instruction, the RTE to obtain the second target data, for the target SWC to use the second target data on the RTE. It should be noted herein that the second target data is not directly sent to the target SWC, but is received by the RTE. When the target SWC needs to use the second target data, the second target data is used through calling.

In the foregoing implementation of this application, how the target integrated module manages the response/request-based received data of the target SWC is specifically described. This is flexible.

In a possible implementation of the second aspect, after obtaining the first instruction sent by the target message subscriber, the target integrated module may store identification information of a message subscriber (for example, Sub3) corresponding to the target message publisher (for example, Pub3). The identification information may be an address of the message subscriber, or may be a field corresponding to the message subscriber, and any information that can uniquely identify the message subscriber may be referred to as the identification information in this application. A type of the identification information is not limited herein. Alternatively, after obtaining the first instruction sent by the target message subscriber, the target integrated module may send the identification information to the RTE, and the RTE stores the identification information.

In the foregoing implementation of this application, it is specifically described that when the target integrated module manages the response/request-based received data of the target SWC, the target integrated module may store the identification information of the message subscriber corresponding to the target message publisher, or send the identification information to the RTE, for the RTE to store the identification information. An objective of storing the identification information is that when the target SWC feeds back data, no pairing search is required, and a specific message subscriber with feedback to be sent to can be directly determined, thereby reducing a delay.

In a possible implementation of the second aspect, execution of the automatic discovery mechanism of the DDS architecture is triggered by a target module (for example, a DDS-SD module) embedded in a BSW management unit (BSW-M) in the BSW. The target module is configured to manage an exchange process of an SPDP message and/or an SEDP message corresponding to each participant (for example, uniformly manage behavior, a parameter, and the like of each participant). The exchange process is used to implement the automatic discovery mechanism of the DDS architecture.

In the foregoing implementation of this application, the target module is embedded to resolve a service discovery problem, and automatic discovery of the DDS architecture is implemented by using the embedded target module. This is implementable.

In a possible implementation of the second aspect, the method may further include: The system architecture generates a code snippet from SPDP information and/or SEDP information corresponding to each participant, and when a first participant is in an automatic discovery process, assembles a code snippet corresponding to the first participant, to form SPDP information and/or SEDP information corresponding to the first participant, where the first participant is one or more participants.

In the foregoing implementation of this application, the code snippet is generated in advance from the SPDP information and/or the SEDP information corresponding to each participant, and assembly is performed during running. In this manner, memory background noise can be reduced, and memory space can be saved.

In a possible implementation of the second aspect, the method may further include: when the target SWC has a DDS history cache (history cache) requirement, determining that the target SWC meets the DDS history cache requirement by occupying memory space.

In the foregoing implementation of this application, if the target SWC has the DDS history cache requirement, the target SWC is allowed to occupy the memory space. This implements on-demand memory space allocation.

In a possible implementation of the second aspect, the method may further include: when the target SWC does not have a DDS history cache (history cache) requirement, determining that the target SWC occupies memory space by using stack space.

In the foregoing implementation of this application, if the target SWC does not have a DDS history cache requirement, the target SWC directly occupies the memory space by using the stack space. This is flexible.

A third aspect of embodiments of this application further provides a method for implementing DDS communication based on AUTOSAR. The method includes: In a network configuration tool, some configuration parameters related to communication by using SOME/IP exist, and network parameter configuration may be directly performed in an original manner (that is, based on a SOME/IP design), to generate a first configuration file. Specifically, based on the SOME/IP design, network parameter configuration is performed by using a network design tool, to generate the first configuration file. If no parameter configuration related to a DDS is customized in the first configuration file, the first configuration file may be automatically filled with a default configuration of the DDS by using a configuration conversion tool, to obtain a filled first configuration file. Then, the filled first configuration file is converted, by using the configuration conversion tool, into a second configuration file that can be identified by the DDS. To be specific, the configuration conversion tool converts a SOME/IP-related configuration into a DDS-related configuration. Related parameters of Event, Method, and Field of SOME/IP are correspondingly converted into a service integration parameter, a participant parameter, and the like of the DDS, a parameter like a port/signal of a CP is converted into a related parameter like DDS Pub/Sub/Topic, and various service IDs are converted into parameters such as a DDS topic name and service discovery-related QoS. In the configuration conversion tool, DDS-related supplementary configurations included in the network configuration tool and an AUTOSAR configuration tool are also considered. A plurality of default configurations (preconfigurations) are stored herein, and a default supplementary configuration is automatically filled based on a configuration in the network configuration tool. Filled parameters may include a DDS QoS parameter during running, a mapping relationship between an SWC signal in an RTE and a DDS, and the like. Finally, the second configuration file is automatically supplemented, by using the AUTOSAR configuration tool, with a parameter configuration of an ECU related to the DDS, to obtain a supplemented second configuration file, and BSW code is generated based on the supplemented second configuration file. It should be noted that the AUTOSAR configuration tool contains some DDS-related supplementary configurations, and the RTE performs interaction for a DDS supplementary rule and a BSW supplementary rule. Advanced developers can also perform customized modification. The BSW code is used to implement a function of the method in any one of the first aspect or the possible implementations of the first aspect.

In the foregoing implementation of this application, how to generate the BSW code by using a series of tools is specifically described. The series of tools integrate a DDS-related supplementary configuration parameter, so that the generated BSW code can be used to implement the function of the method in any one of the second aspect or the possible implementations of the second aspect, and this is implementable.

In a possible implementation of the third aspect, the method further includes: designing a function of an SWC by using an SWC modeling tool, and generating SWC code.

In the foregoing implementation of this application, in addition to generating the corresponding BSW code by using the network configuration tool, the configuration conversion tool, and the AUTOSAR configuration tool, the SWC code further needs to be generated. This is complete.

In a possible implementation of the third aspect, the method further includes: deploying the BSW code and the SWC code on an ECU for running, where a multi-protocol interworking apparatus (Gateway) is deployed on the ECU, and the gateway is configured to implement interworking between SOME/IP and the DDS.

In the foregoing implementation of this application, it is specifically described that the generated BSW code and SWC code are deployed on the ECU for running, and the gateway is deployed to implement interworking between different protocols.

In a possible implementation of the third aspect, the gateway runs an instance to monitor sending ports of all external applications, and performs message running control and message forwarding on a service discovery message and a user message. Specifically, the gateway includes a message conversion module and a message control module. The message conversion module is configured to perform message format conversion between the SOME/IP and the DDS on a received message. The message control module is configured to convert a message receiving and sending process between the SOME/IP and the DDS based on content carried in the message.

In the foregoing implementation of this application, how the gateway implements interworking between the SOME/IP and the DDS is specifically described. Different from that in a conventional solution, the gateway provided in an embodiment of this application does not run receiving and sending protocols of two protocols, but runs one instance. This improves system running performance.

In a possible implementation of the third aspect, the method further includes: performing parameter configuration by using a design tool, and generating a third configuration file; and generating target code based on the third configuration file, where the target code is used to implement a function of the gateway.

In the foregoing implementation of this application, it is specifically described that the gateway may also automatically generate code by using the corresponding design tool, and this is flexible.

A fourth aspect of embodiments of this application provides a computer device. The computer device has a function of implementing the method according to any one of the second aspect or the possible implementations of the second aspect. The function may be implemented by using hardware, or may be implemented by using hardware executing corresponding software. The hardware or the software includes one or more modules corresponding to the foregoing function.

A fifth aspect of embodiments of this application provides a tool system. The tool system has a function of implementing the method according to any one of the third aspect or the possible implementations of the third aspect. The function may be implemented by using hardware, or may be implemented by using hardware executing corresponding software. The hardware or the software includes one or more modules corresponding to the foregoing function.

A sixth aspect of embodiments of this application provides a computer device. The computer device may include a memory, a processor, and a bus system, the memory is configured to store a program, and the processor is configured to invoke the program stored in the memory, to perform the method according to any one of the second aspect or the possible implementations of the second aspect in embodiments of this application.

A seventh aspect of embodiments of this application provides a tool system. The tool system may include a memory, a processor, and a bus system, the memory is configured to store a program, and the processor is configured to invoke the program stored in the memory, to perform the method according to any one of the third aspect or the possible implementations of the third aspect in embodiments of this application.

An eighth aspect of embodiments of this application provides a computer-readable storage medium. The computer-readable storage medium stores instructions. When the instructions are run on a computer, the computer is enabled to perform the method according to any one of the second aspect or the possible implementations of the second aspect, or the computer is enabled to perform the method according to any one of the third aspect or the possible implementations of the third aspect.

A ninth aspect of embodiments of this application provides a computer program. When the computer program is run on a computer, the computer is enabled to perform the method according to any one of the second aspect or the possible implementations of the second aspect, or the computer is enabled to perform the method according to any one of the third aspect or the possible implementations of the third aspect.

A tenth aspect of embodiments of this application provides a chip. The chip includes at least one processor and at least one interface circuit. The interface circuit is coupled to the processor. The at least one interface circuit is configured to perform receiving and sending functions, and send instructions to the at least one processor. The at least one processor is configured to run a computer program or instructions, and has a function of implementing the method according to any one of the second aspect or the possible implementations of the second aspect, or has a function of implementing the method according to any one of the third aspect or the possible implementations of the third aspect. The function may be implemented by hardware, or may be implemented by software, or may be implemented by a combination of hardware and software. The hardware or the software includes one or more modules corresponding to the foregoing function.

DESCRIPTION OF EMBODIMENTS

Figure 1:
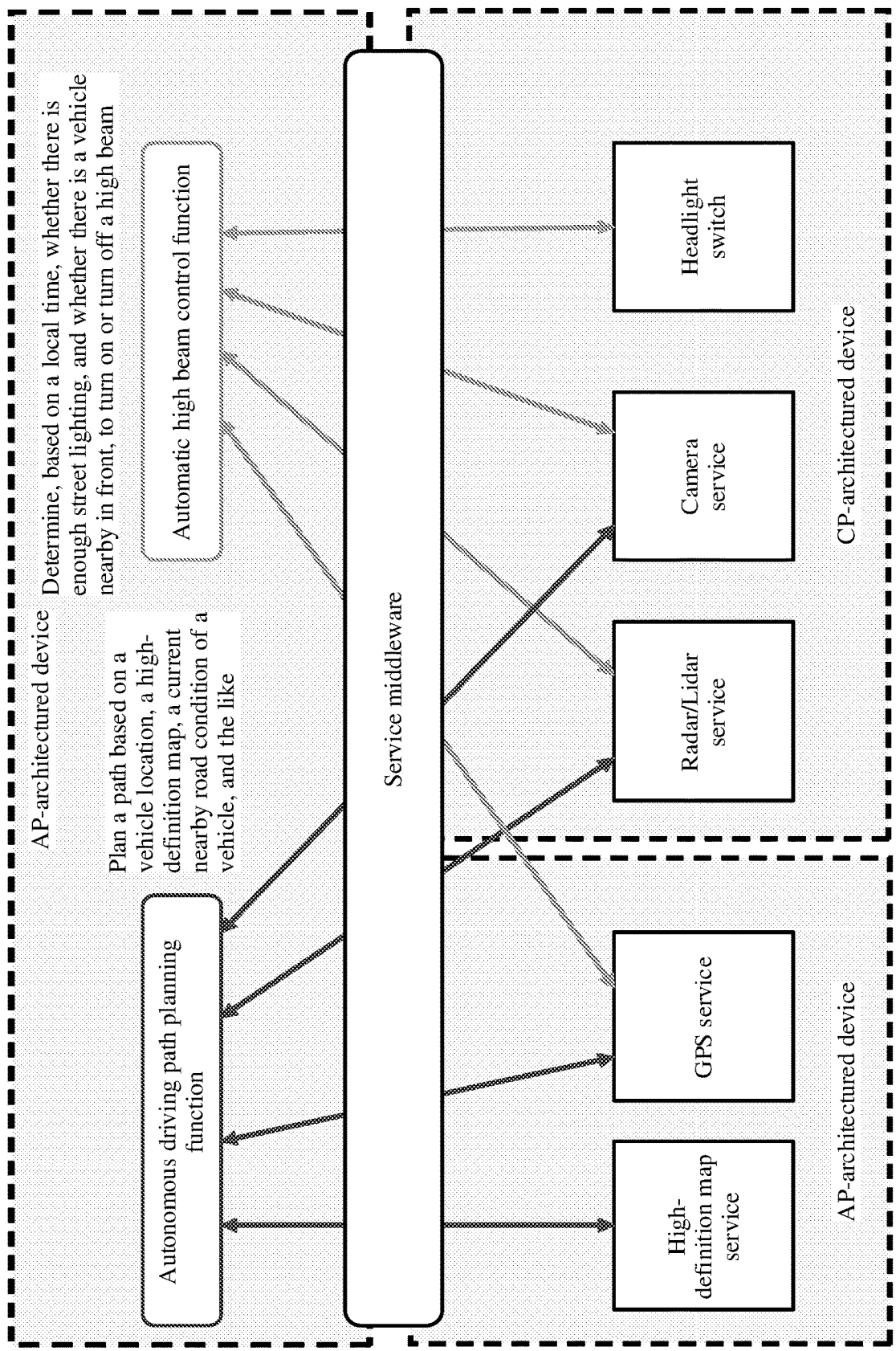
FIG. 1 shows an example of a service-oriented application according to an embodiment of this application.

Embodiments of this application provide a system architecture for implementing DDS communication based on AUTOSAR, a communication method, and a device, to integrate a DDS into BSW in a CP software architecture, so that the DDS is compatible with a CP, and an SWC is unaware of modification of underlying software.

In the specification, claims, and accompanying drawings of this application, terms "first", "second", and the like are intended to distinguish between similar objects but do not necessarily indicate a specific order or sequence. It should be understood that the terms used in such a way are interchangeable in appropriate circumstances. This is merely a discrimination manner that is used when objects having a same attribute are described in embodiments of this application. In addition, the terms "include", "have", and any variants thereof are intended to cover non-exclusive inclusion, so that a process, method, system, product, or device including a series of units is not necessarily limited to those units, but may include other units that are not clearly listed or are inherent to the process, method, product, or device.

Embodiments of this application relate to a lot of related knowledge about a CP and an AP. To better understand the solutions in embodiments of this application, the following first describes related terms and concepts that may be used in embodiments of this application. For details, refer to Table 1. It should be understood that explanations of related concepts may be limited due to specific situations of embodiments of this application, but this does not mean that this application can only be limited to the specific situations. There may be differences between specific situations in different embodiments. This is not specifically limited herein.

TABLE 1

Description of related terms and concepts

| English acronym/term | Complete English expression/standard English term | Chinese expression/Chinese term |
|---|---|---|
| AP | Adaptive Platform AUTOSAR | AUTOSAR adaptive platform: is usually referred to as adaptive AUTOSAR, is mainly oriented to a future intelligent vehicle scenario, is applied to fields such as autonomous driving and advanced assisted driving, and is usually deployed in a chip with relatively strong computing power. |
| ARA::COM (CM) | AUTOSAR Run-time for Adaptive::Communication (Communication Management) | AUTOSAR runtime for adaptive::communication, that is, communication management, provides an AP communication service, uses a proxy/skeleton communication architecture, and encapsulates communication protocols DDS and SOME/IP into a service form, for example, an Event form, a Method form, or a Field form. |
| AUTOSAR | AUTOmotive Open System Architecture | Automotive open system architecture: is an open and standardized software architecture developed for the automobile industry. The automotive open system architecture is a software architecture system that is jointly established by global automakers, component suppliers, and other electronic, semiconductor, and software system companies and in which members maintain a development partnership. |

TABLE 1-continued

Description of related terms and concepts

| English acronym/term | Complete English expression/standard English term | Chinese expression/Chinese term |
|---|---|---|
| BSW | Basic Software | Basic software layer: provides a basic software capability for an upper layer. |
| CDD | Complex Device Driver | Complex device driver: is configured to carry a function module beyond a CP specification and provides an interface for an application layer to use. |
| COM | Communication | An AUTOSAR BSW internal module provides a basic communication service, is connected to an RTE upward, provides a signal interface for the RTE, and is connected to a PDU-R downward. In addition, there is an LDCOM module, that is, large data communication, which is used for large data packet communication and is usually used by SOME/IP. |
| CORBA | Common Object Request Broker Architecture | Common object request broker architecture: is a solution proposed by OMG to resolve interconnection between hardware and software systems in a distributed processing environment. |
| CP | Classic Platform AUTOSAR | AUTOSAR classic platform: is usually referred to as classic AUTOSAR, and is widely used in in-vehicle ECUs with low computing power. |
| DDS | Data Distribution Service | Data distribution service: is data-centered distributed message communication middleware. |
| DDS-SD/SOME/IP-SD | DDS-Service Discovery, SOME/IP-Service Discovery | DDS-service discovery/SOME/IP-service discovery: Before a client and a service of a service really communicate with each other, the two ends need to perform a service discovery process. In this way, the two ends can know a specific party that sends and receives messages or whether a message can be sent. |
| GW | Gateway | Gateway: is used to connect two networks that use different protocols. |
| HLA | High Level Architecture | High level architecture: In the modeling and simulation master plan formulated by the U.S. Defense Modeling and Simulation Office in October 1995, a common technical framework for future modeling/simulation is proposed. |
| OMG | Object Management Group | Object management group: is an international association that originally aims to establish a standard for distributed object-oriented systems, and is currently committed to establishing a modeling standard for programs, systems, and service processes, and a model-based standard. |
| PDU-R | Protocol Data Units Router | Protocol data unit router: The PDU-R is located in the center of an AUTOSAR communication architecture, and routes data of various communication protocols to corresponding protocol channels in a BSW architecture. |
| POSIX | Portable Operating System Interface | General term of a series of mutually associated standards used by the IEEE to define APIs to run software on various UNIX operating systems. |
| Qos | Quality of Service | Quality of service: means that a network can use various basic technologies to provide a better service capability for specified network communication, is a security mechanism of the network, and is a technology used to resolve problems such as a network delay and congestion. In this specification, the quality of service refers in particular to a quality of service function provided by a DDS. |
| RPC | Remote Procedure Call | Remote procedure call: is a protocol in which a service is requested from a remote computer program over a network without knowing an underlying network technology. |

TABLE 1-continued

Description of related terms and concepts

| English acronym/term | Complete English expression/standard English term | Chinese expression/Chinese term |
|---|---|---|
| RTE | Runtime Environment | Runtime environment: is an interface implementation of a virtual function bus (VFG) in AUTOSAR, provides a basic communication function, and supports communication between software components and communication between a software component and a basic software module. |
| RTPS | Real-time Publish-Subscribe Protocol | Real-time publish-subscribe protocol: is a protocol for implementing a communication capability in a DDS, and ensures interoperability. |
| SoAd | Socket Adaptor | Socket adaptor: is connected to a PDU-R upward, and adapts data forwarded by the PDU-R to a socket for communication, or performs a reverse process. |
| SOME/IP | Scalable service-Oriented Middleware over IP | Scalable service-oriented middleware over IP: is a protocol used for in-vehicle Ethernet network communication, and is introduced by a CP specification. |
| SEDP | Simple Endpoint Discovery Protocol | Simple endpoint discovery protocol: is used to implement a mutual discovery process between endpoints in a participant in a DDS. |
| SOA | Service-Oriented Architecture | Service-oriented architecture: is a service idea-oriented software design method. |
| SPDP | Simple Participant Discovery Protocol | Simple participant discovery protocol: is used to implement a mutual discovery process between participants in a DDS. |
| SWC | Software Component | Software component: A CP application layer includes several SWCs, which implement various specific functions. |
| Publish/Subscribe | | In a software architecture, publish-subscribe is a message paradigm. A message sender (referred to as a publisher) does not directly send a message to a specific receiver (referred to as a subscriber). Instead, published messages are classified into different categories without a need to know which subscribers (if any) may exist. Similarly, the subscriber may express interest in one or more categories and receive only a message of interest without a need to know which publishers (if any) exist. |
| Serialization | | In computer science, data processing refers to a process in which a data structure or an object status is converted into a usable format (for example, stored as a file, stored in a buffer, or sent through a network) for subsequent restoration to an original state in the same computer environment or another computer environment. |

Evolution of intelligence has greatly increased importance of software in intelligent vehicles, leading to the emergence of a concept of "software-defined vehicle". Accordingly, there is a strong demand for an SOA, which is originally a concept in the IT field, but has become a hot topic in the automobile industry currently. The SOA requires that architecture design of vehicle software be based on a "service" idea. To be specific, capabilities provided by software and hardware in a vehicle, such as sensor data and actuator functions, are provided in a form of services. Advanced function software in the intelligent vehicle requests these services, and uses obtained information to implement advanced functions (such as a path planning function), or requests an actuator to perform a specific action (like high beam control). This architecture helps achieve a loose-coupling service architecture, where all services or function modules do not interfere with each other. In addition, functions can be more easily migrated to different hardware and software platforms, facilitating independent development.

For ease of understanding, FIG. 1 shows an example of a service-oriented application according to an embodiment of this application. An autonomous driving path planning function and an automatic high beam control function are advanced functions that can be sensed by a user and that are deployed in an AP architecture. These functions require various services to provide data and control capabilities. Each service may be from a simple capability provided by one ECU, or may be from a complex capability like a map service or a GPS service provided by an AP device (that is, a device on which an AP is deployed, which is usually a CPU board with high computing power). These services communicate with the advanced functions through service middleware (service middleware) to finally implement the functions.

Due to coexistence of a CP and an AP in an automotive electronic and electrical architecture as well as the growing popularity of service-oriented requirements, CP specifications previously formulated for conventional automobiles cannot fully meet requirements of a current vehicle electronic service-oriented architecture. A problem arises in the form of a lack of unified service-oriented communication between the CP and the AP, which can be solved by aspects of the present disclosure.

Before a method for implementing DDS communication based on AUTOSAR in embodiments of this application is described, a CP ecosystem is first described, then communication protocols used in an AP and a CP are described, and finally problems in implementing servitization in current CP and AP specifications are pointed out.

Figure 2:
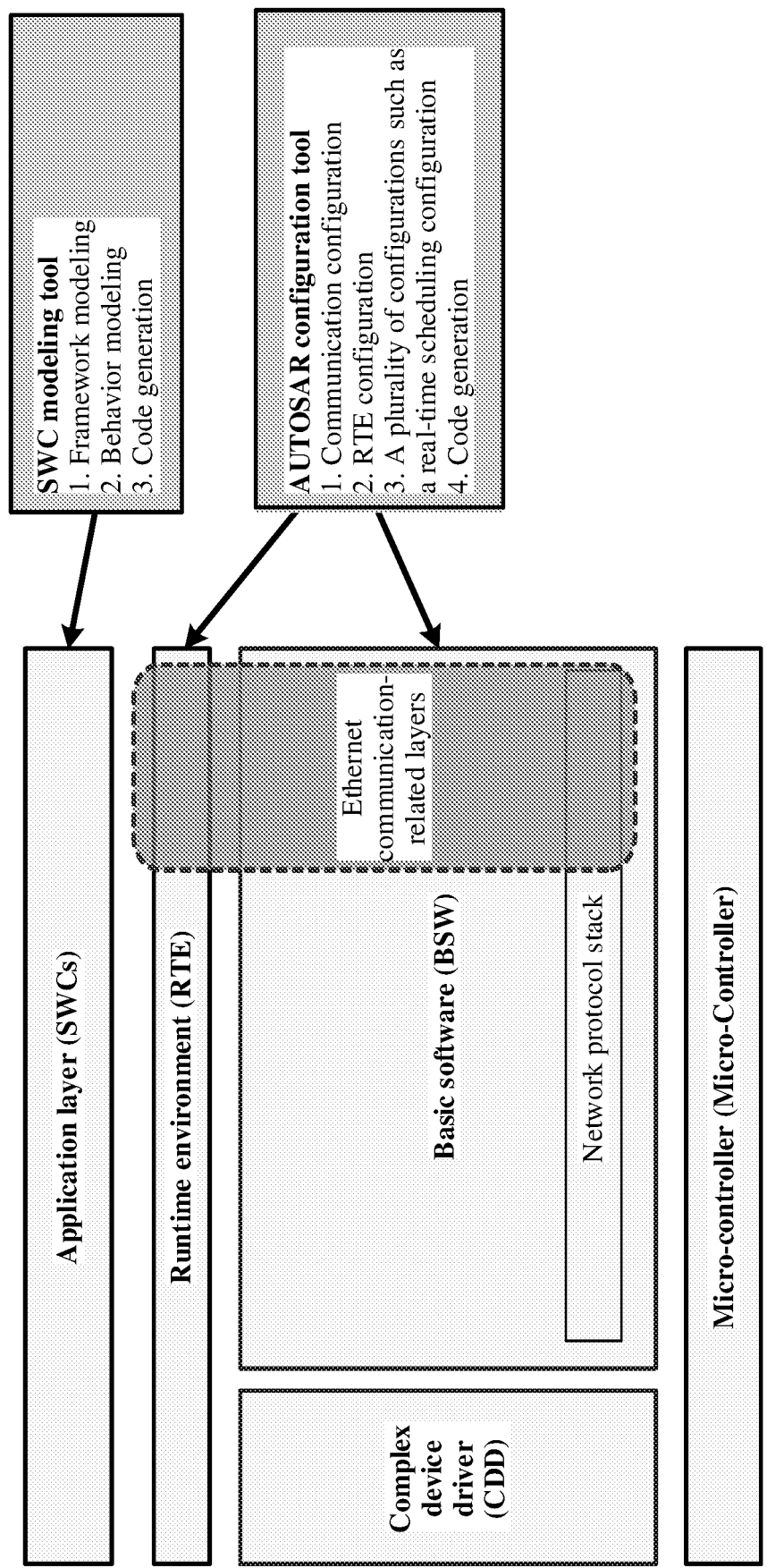
FIG. 2 is a schematic diagram of an AUTOSAR ecosystem according to an embodiment of this application.

First, the CP ecosystem is described. For details, refer to FIG. 2. FIG. 2 is a schematic diagram of an AUTOSAR ecosystem according to an embodiment of this application. The AUTOSAR ecosystem includes a software architecture and a tool form. An uppermost layer in the software architecture is an application layer (Application Layer). Several SWCs are deployed at the application layer, and each SWC is configured to implement a corresponding specific function. Running of the SWC requires an RTE to provide a runtime environment, which implements communication between internal SWCs and a signal connection and a scheduling connection between the SWC and a BSW. The BSW is referred to as a basic software layer, and provides various basic capabilities for the upper-layer software SWC, such as a communication capability, a memory management capability, hardware abstraction, and drive. The SWC implements Ethernet communication, and needs to interact with the RTE. The RTE delivers a signal to the BSW for signal processing, and finally a processed signal is delivered to a network protocol stack for sending. Signal receiving is a process opposite to the foregoing process, and details are not described herein. In addition, a CDD layer is used to store a function module falling outside a CP specification. To be specific, for a capability that is required by software but not specified in the AUTOSAR protocol, a developed function may be configured in the CDD, and a call interface is exposed to an application.

A tool is a group of tool software released together with an AUTOSAR software stack. The AUTOSAR is used in a different manner from conventional basic software. The conventional basic software (for example, an operating system) is released by a vendor, and a user downloads and installs the software. Then, the user compiles application code, calls various capabilities of the basic software, and finally deploys the software on technical software for running. However, the AUTOSAR runs on different hardware devices. Each ECU on a vehicle may implement a different function, and use a different hardware capability, software capability, and communication capability. Each application implements a different function. Therefore, the AUTOSAR is a highly customized software architecture. An enterprise that develops the AUTOSAR provides a matched tool. A user uses the tool to configure an internal parameter of the AUTOSAR and design an application. Then, the tool generates code of the application and AUTOSAR basic software. The generated code is deployed on an ECU for running. The code may not need to be manually written. Alternatively, only some uncommon function implementation logic needs to be manually written during application development.

AUTOSAR tools can be generally classified into two types: an SWC modeling tool and an AUTOSAR configuration tool. The SWC modeling tool is used to perform framework modeling and behavior modeling on an application, and finally generate SWC code. The AUTOSAR configuration tool is used to configure a parameter and behavior of each layer (for example, perform communication parameter configuration, RTE parameter configuration, scheduling parameter configuration, and the like), and finally generate AUTOSAR basic code, which may be referred to as BSW code. A combination of the two types of code and some static basic AUTOSAR code enable an ECU function to run.

Figure 3:
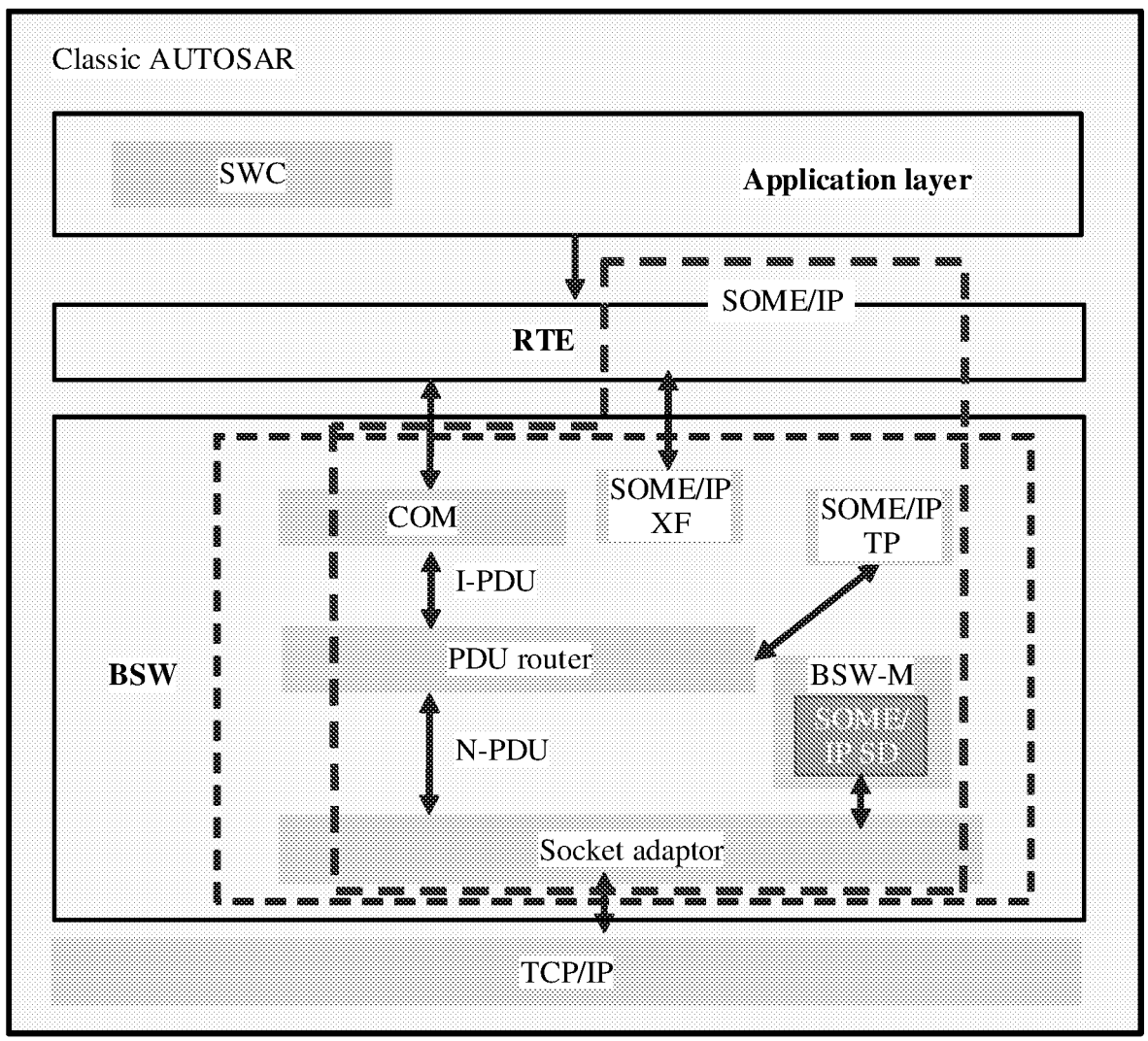
FIG. 3 is a schematic diagram of CP communication according to an embodiment of this application.
Figure 4:
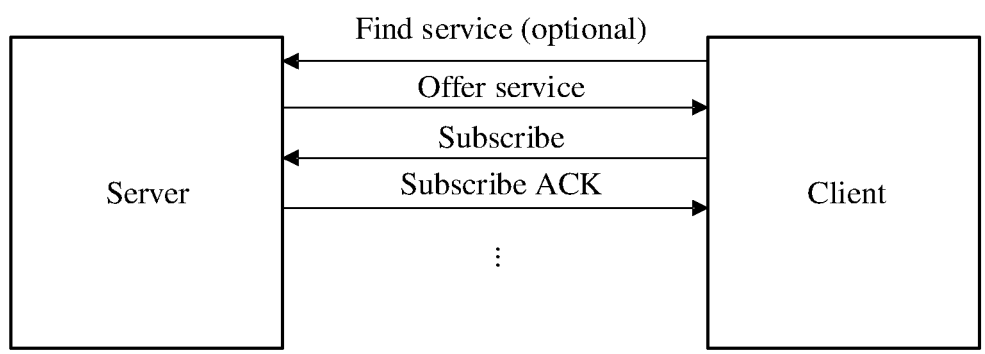
FIG. 4 is a schematic diagram of a SOME/IP service discovery process according to an embodiment of this application.

The following describes a CP communication protocol. FIG. 3 is a schematic diagram of CP communication according to an embodiment of this application. It is specified that a SOME/IP protocol is used for CP Ethernet communication. A part enclosed by a thick dashed-line box in FIG. 3 is a SOME/IP submodule and a related CP module. In the CP specification, the SOME/IP protocol is used for Ethernet communication, and SOME/IP depends on an RTE and a COM module (which is usually LDCOM)/PduR module/SoAd module inside a BSW to implement interconnection with a network protocol stack, service ID search, and data sending and receiving logic control. For service discovery (that is, a SOME/IP server (that is, a SOME/IP application serves as a server) and a SOME/IP client (that is, a SOME/IP application serves as a client) find each other or confirm online statuses of each other, to start to provide a service and request a service), a service discovery function is controlled in a BSW-M (Manager). FIG. 4 is a schematic diagram of a SOME/IP service discovery process according to an embodiment of this application. Through the process shown in FIG. 4, a server and a client establish a connection, and a service communication process may start.

Figure 5:
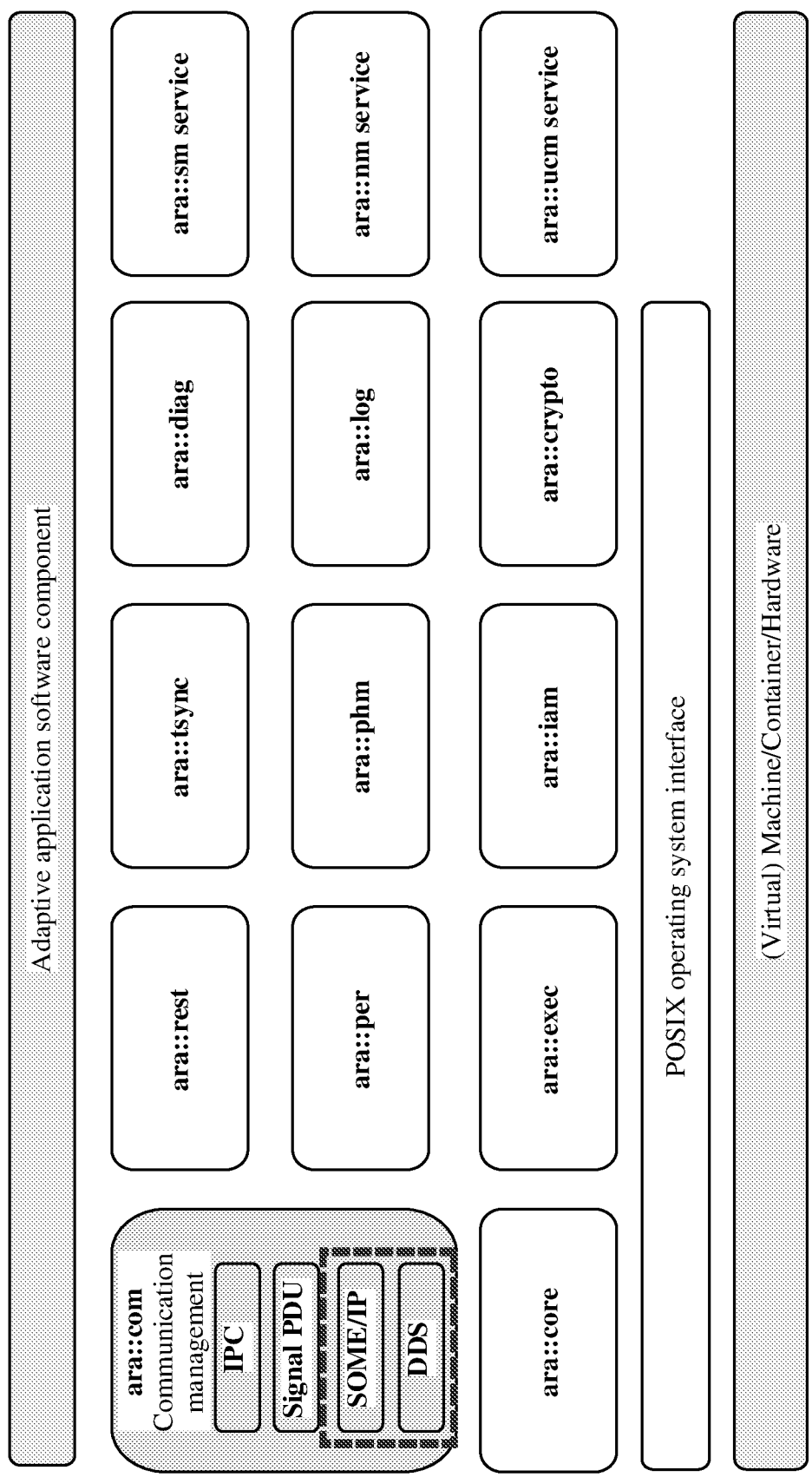
FIG. 5 is a schematic diagram of AP communication according to an embodiment of this application.

The following describes an AP communication protocol. Refer to FIG. 5. AP is a basic software architecture based on a POSIX interface, and internally provides various function modules for use by an upper-layer application. As shown in FIG. 5, an ARA::COM module provides a communication service capability. The specification specifies that SOME/IP and DDS communication middleware are used for Ethernet communication. In an AP device, SOME/IP and DDS are compatible. ARA::COM packages automatic discovery and data communication capabilities of the middleware into a service discovery capability, and manages and controls service-oriented communication.

Figure 6:
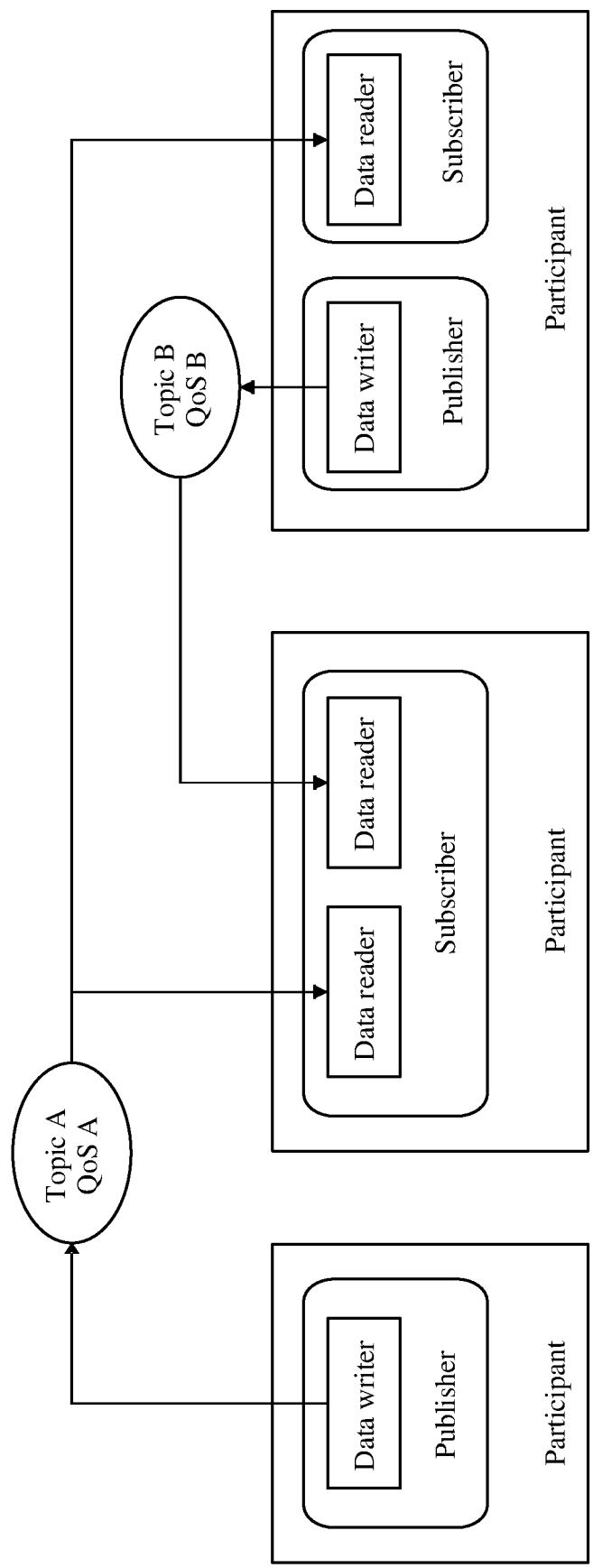
FIG. 6 is a schematic diagram of a DDS publish-subscribe model according to an embodiment of this application.

DDS is a next-generation distributed real-time communication middleware technical specification formulated by the object management group (object management group, OMG) based on standards such as HLA and CORBA. DDS uses a publish/subscribe system architecture, is data-centered, provides many QoS quality of service policies, can ensure real-time, reliable, and flexible data distribution, and can meet various distributed real-time communication application requirements. FIG. 6 is a schematic diagram of a DDS publish-subscribe model according to an embodiment of this application. The DDS publish-subscribe model shows a running logic architecture of DDS (DDS is a set of architecture standards, a participant (Participant) may be considered as an application, and the application participant needs to run according to a DDS standard). An outermost running entity of DDS is referred to as a participant (Participant). One or more message publishers (Publisher, Pub) and message subscribers (Subscriber, Sub) may be deployed in the participant. The publisher and the subscriber are code logic and may be considered as a data sending module and a data receiving module in the participant application. Quantities of publishers and subscribers to be deployed are defined in a network design tool phase. A data writer of the publisher and a data reader of the subscriber are paired by using a same topic name (Topic Name) and compatible QoS. In this way, the message publisher can send a message to the matched message subscriber. The message publisher and the message subscriber may respectively have one or more data writers and one or more data readers. Topic names or QoS of different data writers of each message publisher are/is not limited to being consistent. This brings great flexibility to message communication.

It should be noted that each data writer or data reader has its own history cache (History Cache). For the data writer, the history cache is used to cache data that needs to be sent; for the data reader, the history cache is used to cache received data. The essence of DDS data transmission is information transmission between history caches of a transmit end and a receive end.

Figure 7:
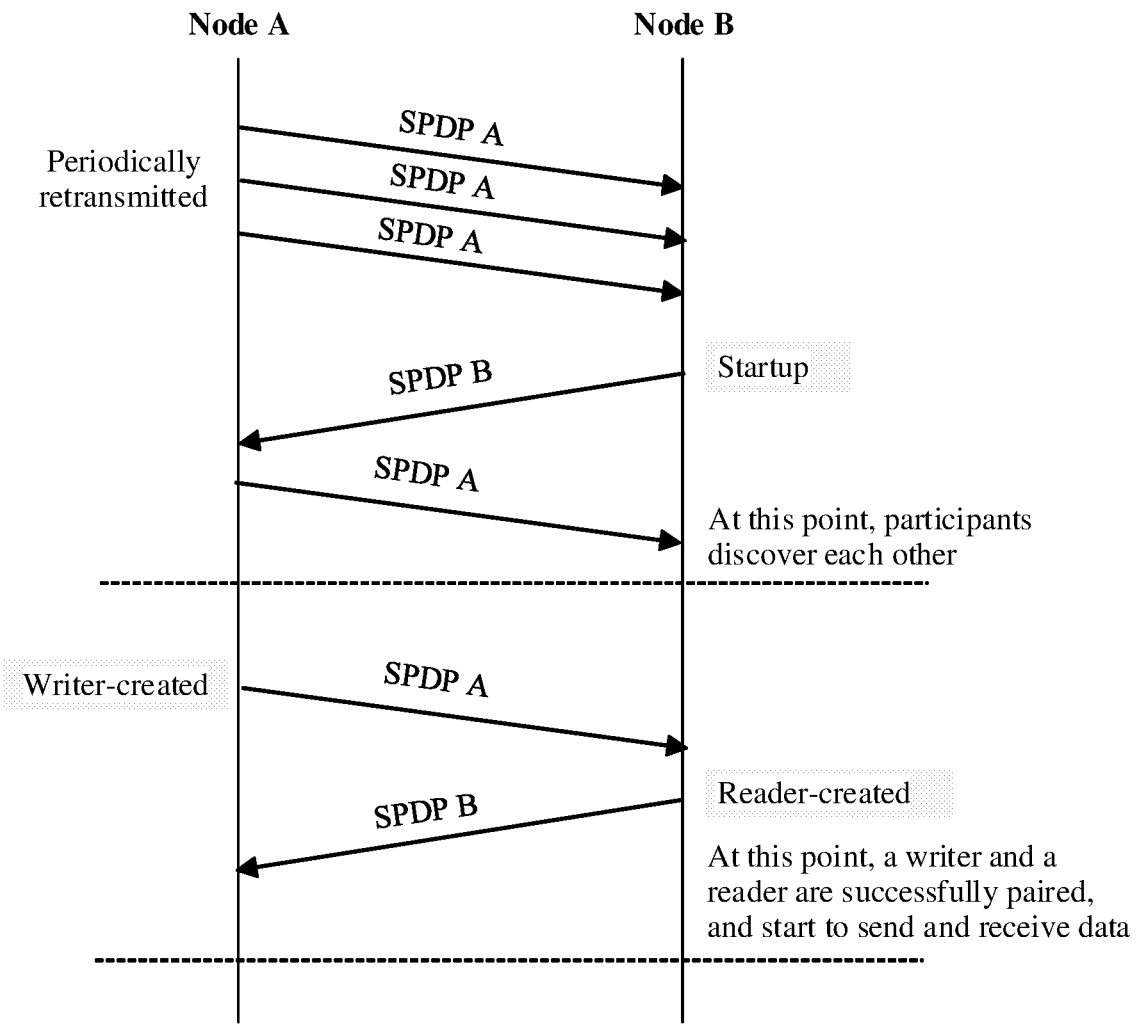
FIG. 7 is a schematic diagram of an automatic DDS service discovery process according to an embodiment of this application.

FIG. 7 is a schematic diagram of an automatic DDS service discovery process according to an embodiment of this application. First, SPDP data packets are sent and received to perform pairing between participants, and then SEDP data packets are sent and received between paired participants. Entities (that is, a publisher or a subscriber) inside a participant are paired, and a data writer and a data reader that are paired may send and receive data. A node A and anode B in FIG. 7 are two running instances of DDS, that is, two DDS-based participants.

It can be learned that, node pairing manners in SOME/IP and DDS are different. For data sending and receiving, DDS provides various QoS capabilities and depends on a history cache.

Figure 8:
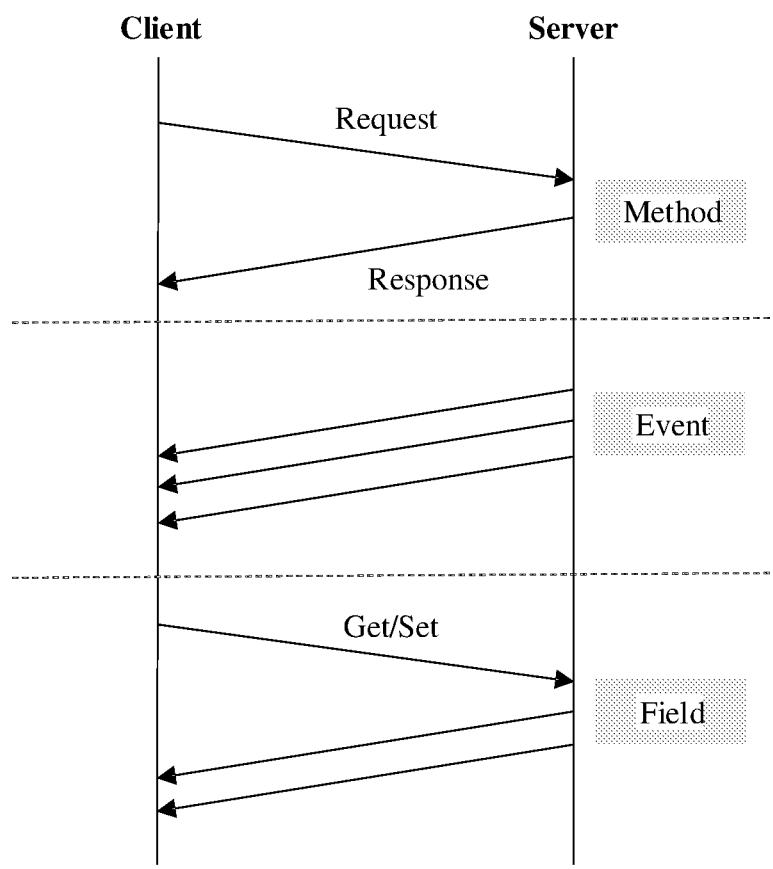
FIG. 8 is a schematic diagram of three service-oriented communication forms according to an embodiment of this application.

CP and AP specify a same service-oriented communication form. Specifically, FIG. 8 is a schematic diagram of three service-oriented communication forms according to an embodiment of this application. In a Method manner, a client sends a request message (Request) to a server, and the server generates a response message (Response) based on the request and sends the response message to the client. In an Event manner, a server periodically/aperiodically sends current data to a client. A Field manner may be considered as a combination of Event and Method (that is, a one-out-of-two manner), and is used to obtain data or set a parameter.

Figure 9:
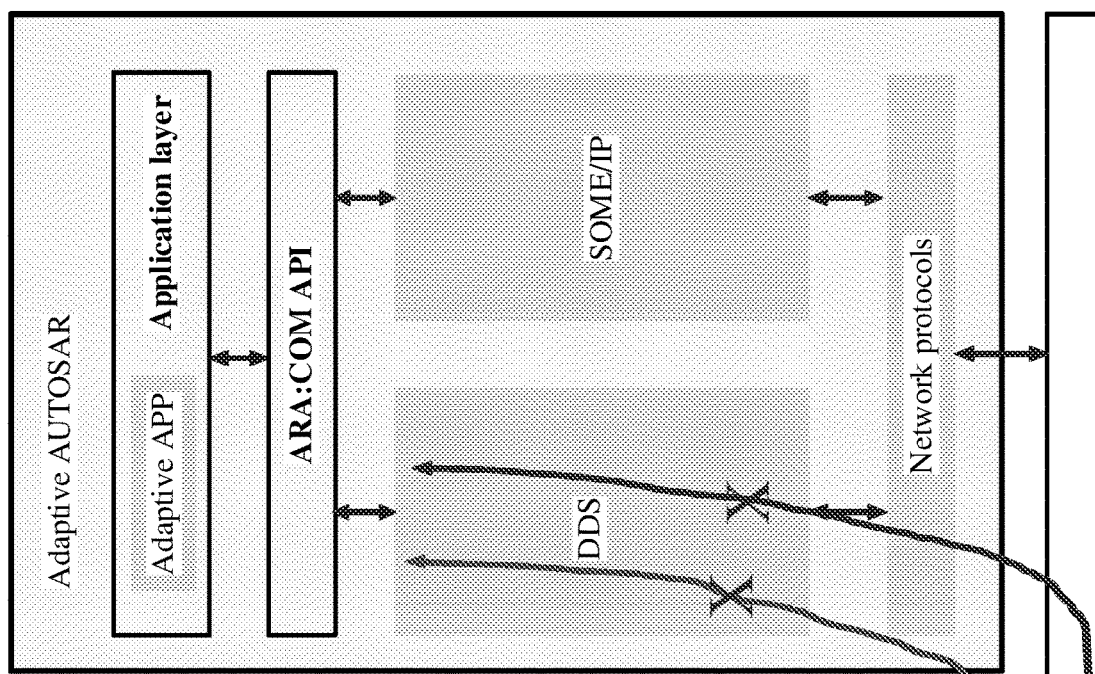
FIG. 9 is a schematic diagram of a problem existing in implementation of service-oriented communication of an intelligent vehicle in an existing AUTOSAR specification according to an embodiment of this application.
Figure 9:
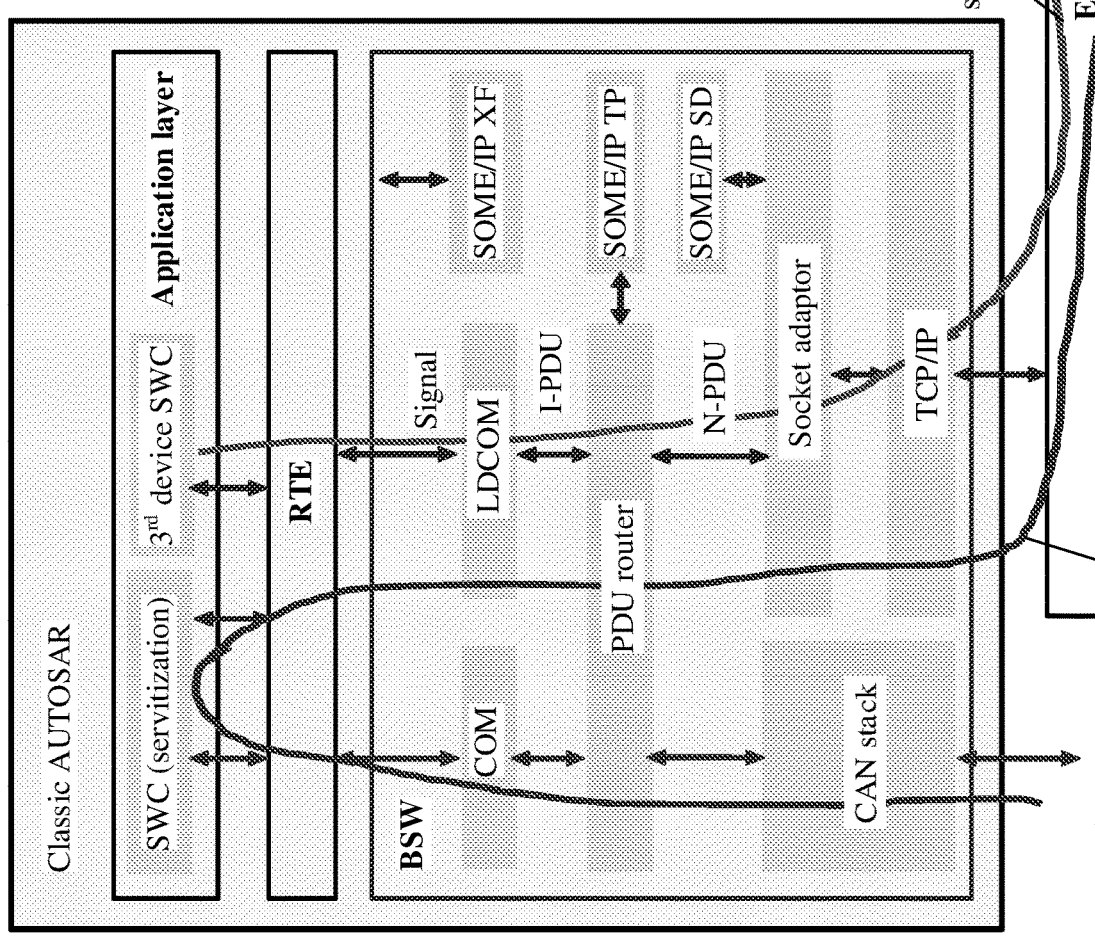

The CP specification specifies that only SOME/IP is used for communication, while DDS and SOME/IP can be used in AP. If some ECUs connected to small components are used to provide a service-oriented capability for domain computing nodes loaded with AP, the service-oriented capability can be provided for only an application that uses SOME/IP for communication in AP. An application that uses DDS cannot use a service provided by the ECU. DDS can provide up to 20 QoS capabilities, implement reliable multicast data transmission, and support large-packet transmission, inter-process communication and cross-core communication in an operating system. Compared with SOME/IP, DDS can meet various different communication requirements. Therefore, more vehicle manufacturers have a strong requirement for using DDS, and an obstacle to service-oriented interworking between CP and AP occurs. Details may be shown by a line segment 1 in FIG. 9. FIG. 9 is a schematic diagram of a problem of an existing AUTOSAR specification in implementation of service-oriented communication of an intelligent vehicle according to an embodiment of this application. If a CP device is connected to a sensor for CAN communication, sensing data is sent to an SWC through a CAN processing path in CP. The SWC performs service-oriented conversion and transfers service-oriented data through a SOME/IP path in CP. In this manner, the CP device can communicate with only an application that use SOME/IP at a peer end, but cannot communicate with a DDS application. (2) Purple wire: If a device developed by a third party is connected, a corresponding SWC is also developed based on the SOME/IP standard, and communication with a peer end also has a problem that an application using DDS in AP is incompatible. In addition, if a vehicle manufacturer further uses a third-party component (for example, a $3^{rd}$ device SWC in FIG. 9) to access AUTOSAR, because the third-party component is also designed strictly according to the CP specification, a corresponding SWC is also developed based on the SOME/IP standard, and a user cannot modify the SWC. In this case, a problem may also occur when an application that uses DDS communicates with the third-party device, which may be specifically shown by a line segment 2 in FIG. 9.

Because DDS is a data-centered architecture idea, that is, DDS provides data receiving and sending capabilities externally, and servitization requires basic software to provide a service-oriented communication capability (currently, a CP device provides the capability by using SOME/IP, and an AP device provides the capability by using ARA::COM and middleware), how to convert a data-centered capability of DDS into a service-centered capability in CP is also a technical problem to be resolved in this application.

Figure 10:
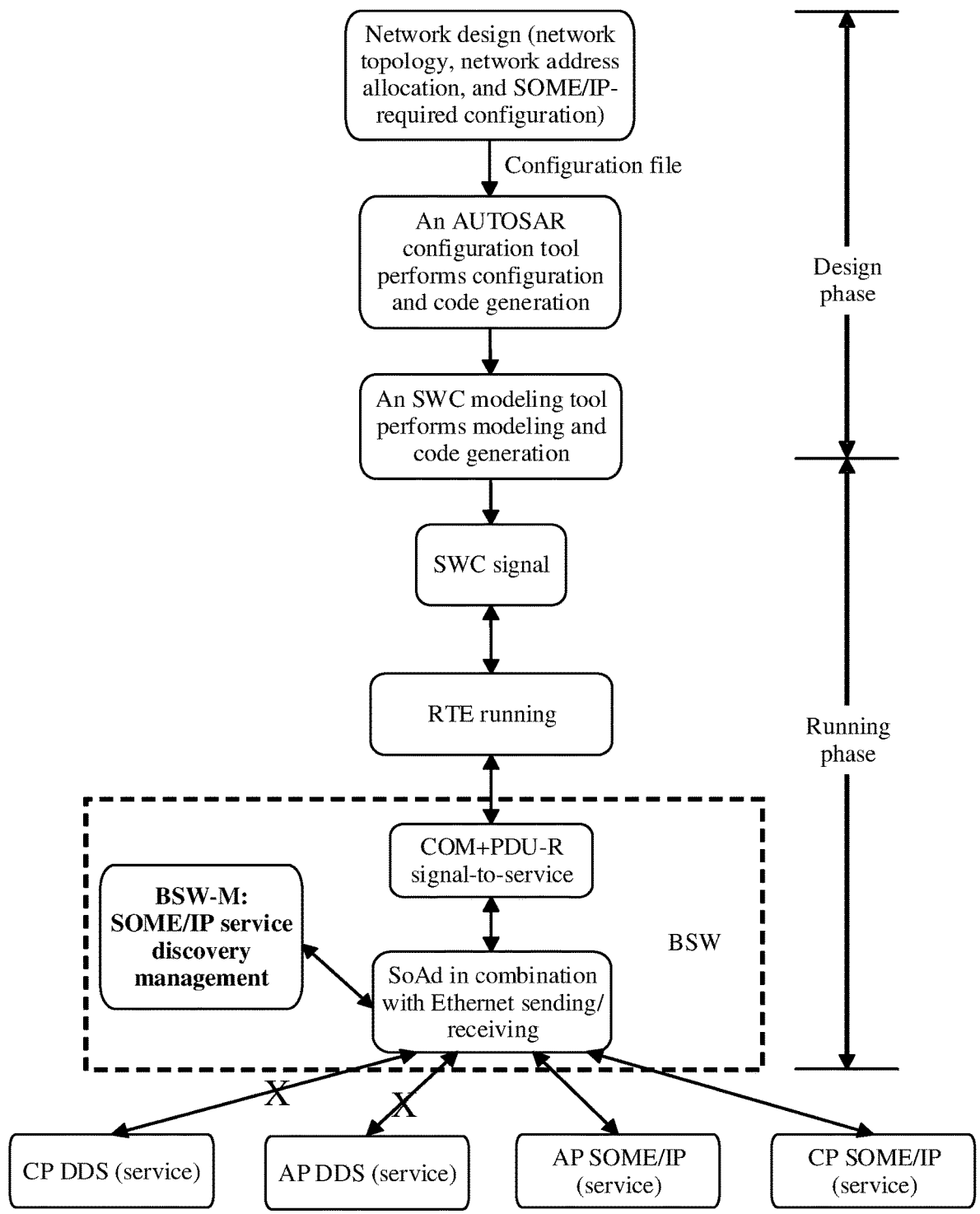
FIG. 10 is a schematic flowchart of software running based on a current technical architecture.

As described above, FIG. 2 shows the software architecture and tool ecosystem of CP. FIG. 9 shows a path for service-oriented interworking between CP and AP based on the existing SOME/IP specification. Based on a current technical architecture, FIG. 10 shows a specific tool design and software running process.

In a design phase, a developer designs a communication network. In this case, the developer needs to consider basic parameters such as network topology and network address allocation, and further needs to consider design of parameters related to SOME/IP service communication, such as various service IDs. After a network configuration tool completes configuration, a configuration file is generated and imported into an AUTOSAR configuration tool (which may also be referred to as an ECU configuration tool, and is collectively referred to as an AUTOSAR configuration tool in embodiments of this application, where details are not described below). Parameters in the network design are also reflected in the AUTOSAR configuration tool, and correspond to related parameters of an RTE and a BSW. Then, the developer can continue to configure another parameter in the tool. Finally, AUTOSAR running code is generated (that is, code of basic software, which is generated by the AUTOSAR configuration tool). Next, the developer uses an SWC modeling tool to design an SWC function and generate SWC code (that is, code of application software, which is generated by the SWC modeling tool). It should be noted that SWC modeling may be performed in parallel with the foregoing work, or may be performed at the beginning (this may also be applicable in the following process, and details are not described again).

In a running phase, service-oriented data sending is used as an example. The SWC transfers a signal to the RTE, and the RTE transfers the signal to modules at a BSW layer. Functions in SOME/IP are combined with COM and PDU-R modules to convert a signal at an application layer into a service-oriented form and send the signal through SoAd. Service-oriented data receiving is a reverse process. It should be noted that all data obtained by the CP device by using the SWC is service-oriented data.

The existing CP specification can meet service-oriented communication between CP and an AP application or a CP application that uses SOME/IP. However, as mentioned above, the existing CP specification cannot meet service-oriented communication between CP and an AP or CP application that uses DDS.

Figure 11:
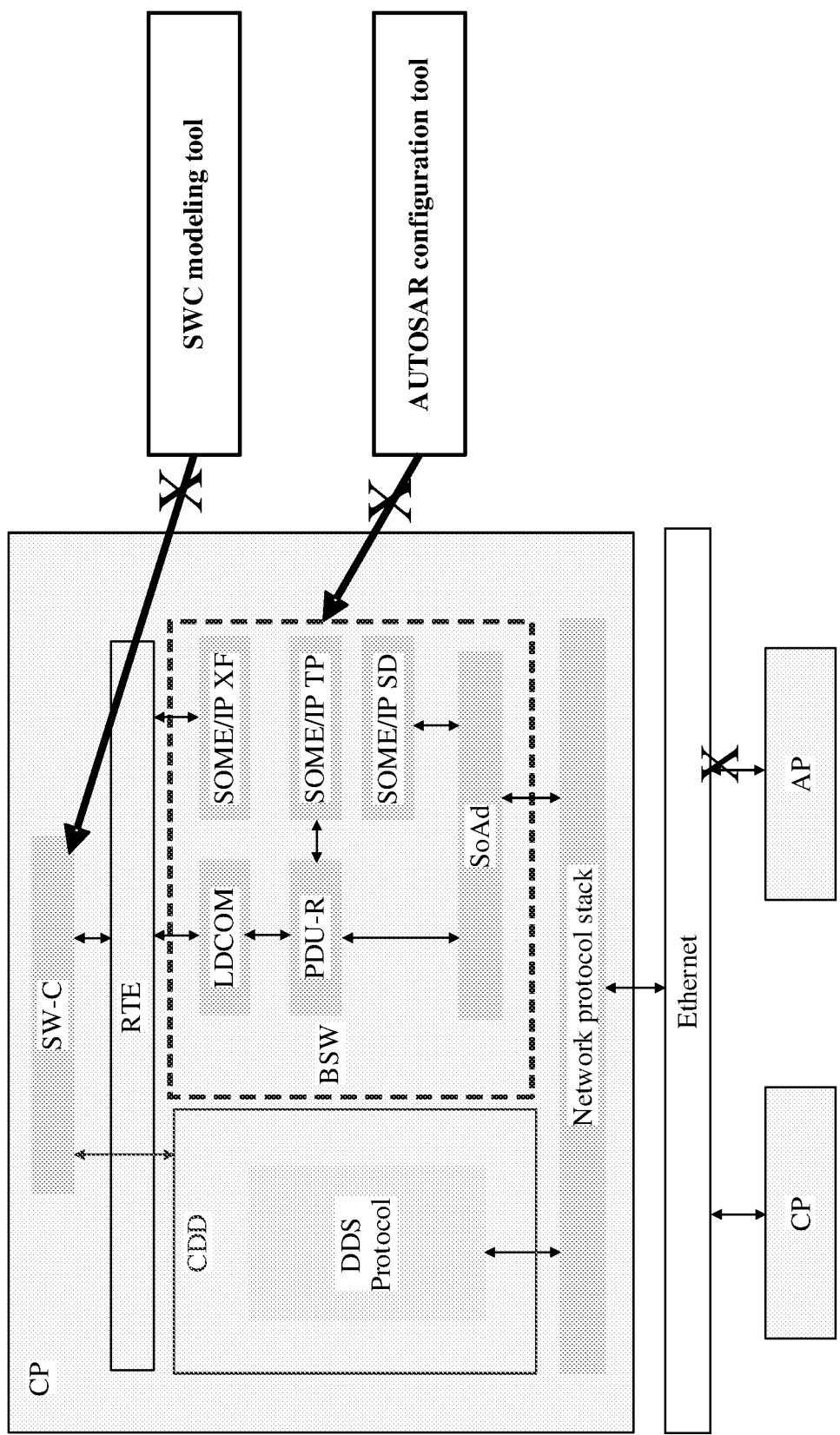
FIG. 11 is a schematic diagram of integrating a DDS into a CDD to implement compatibility.
Figure 12:
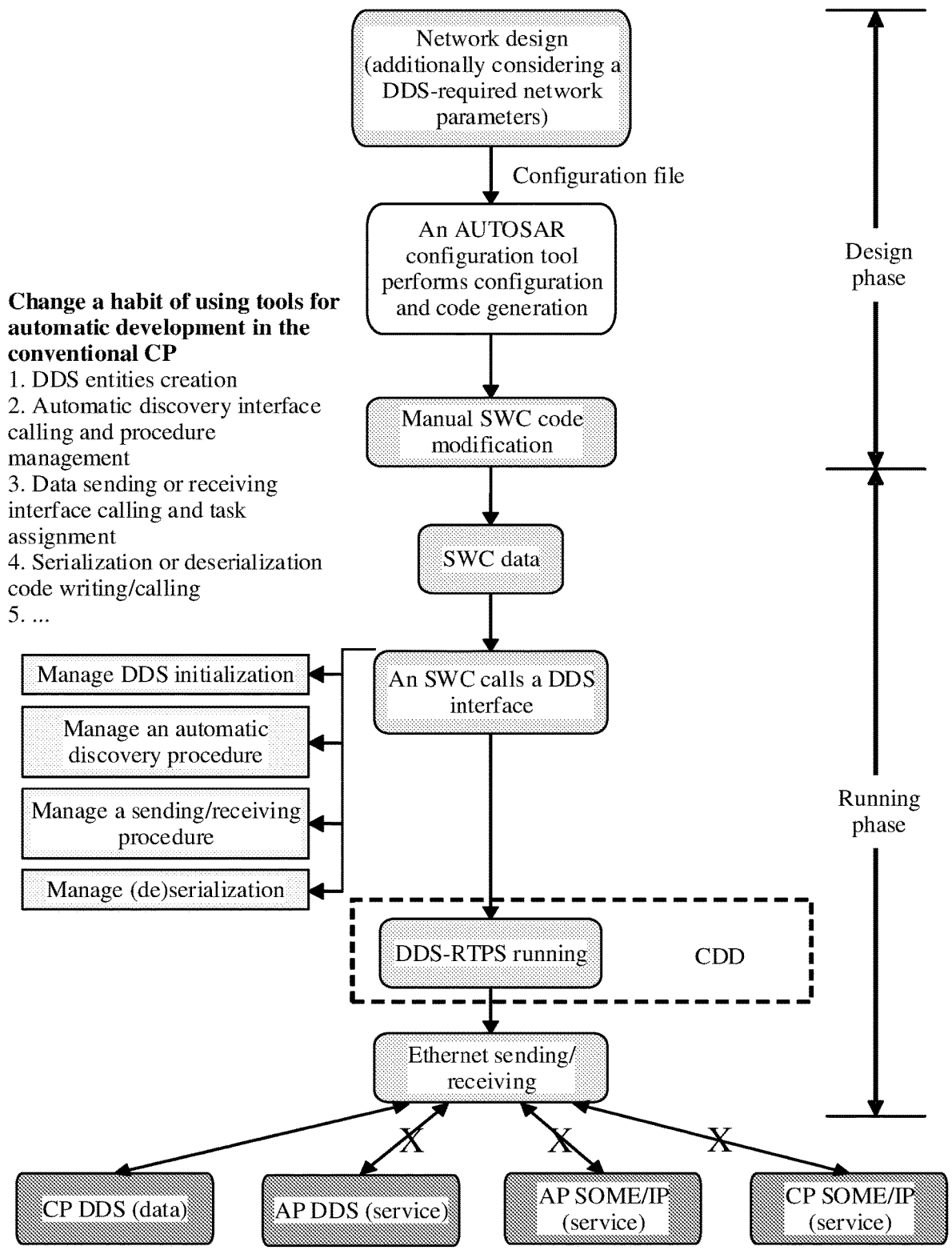
FIG. 12 is a schematic diagram of a design and running process of a CDD implementation solution.

To resolve a problem that a CP application can perform service-oriented communication with an AP or CP application that uses DDS, a solution is shown in FIG. 11. As described above, the CDD is used to carry a function module outside the CP specification, and provide a call interface for an application layer. In this manner, basic functions of DDS are implemented in the CDD. For a supplier, this implementation is relatively convenient, but more complex work is handed over to an SWC developer, and a user-friendly tool development mode cannot be used. In addition, service-oriented communication with AP is not supported. FIG. 12 shows a design and operation process of a CDD implementation solution (a gray box indicates a step difference from the specification solution in FIG. 10). Because DDS is added, in network design, network parameters such as a socket ID and an IP address need to be additionally allocated to a DDS function. A process in AUTOSAR configuration is basically the same as that in FIG. 10. For SWC design, this solution changes the conventional CP habit of using tools for automatic development. A developer needs to manually add and modify a large amount of code to use various DDS interfaces. Operations that need to be considered by the developer when the developer needs to write SWC code include but are not limited to the following content: (1) creation of each instance of DDS and input of various parameters; (2) calling of a DDS automatic discovery interface and procedure control; (3) calling of data sending and receiving interfaces and manual assignment of a running task; and (4) compilation and calling of serialization and deserialization code. In addition, in the running phase, the SWC can only send and receive data, but cannot request and provide services. The SWC directly calls the DDS interface depending on the DDS protocol in the CDD, to perform DDS initialization, automatic discovery, data sending and receiving, and data serialization/deserialization. Finally, the data is sent through the Ethernet (receiving is a reverse process). In this manner, data can be sent and received with only an application that is of another CP device and that uses DDS, but this is not service-oriented communication.

It can be learned from the foregoing content that, this implementation solution has changed the conventional CP habit of using tools for automatic development and code generation, and has a very high requirement on knowledge reserve of a developer. The developer needs to know how to use DDS and an internal communication principle of DDS to identify a network parameter requirement. This also imposes a large amount of workload on the developer. In other words, for a DDS provider, implementation is convenient, but all complex work is imposed on AUTOSAR users. In addition, in this manner, only data receiving and sending can be implemented, and servitization is not implemented. Therefore, data communication can be performed with a CP of another ECU in only a data form, and another interworking form shown in FIG. 12 cannot be implemented. In addition, this implementation has large background noise (>200 KB), which is unacceptable for an embedded ECU device.

Based on the foregoing description, an objective of embodiments of this application is to implement a unified service-oriented communication capability in an entire vehicle, which may be summarized as two points: (1) DDS service-oriented interworking between CP and AP is implemented. (2) An application using DDS is compatible with the existing conventional CP SOME/IP standard, so that service communication of a third-party device is compatible. According to the method provided in embodiments of this application, cross-communication protocol interworking and cross-domain (AP and CP) interworking are implemented for in-vehicle communication with reference to functions in existing specifications, to finally achieve a unified service-oriented communication capability in an entire vehicle.

Figure 13:
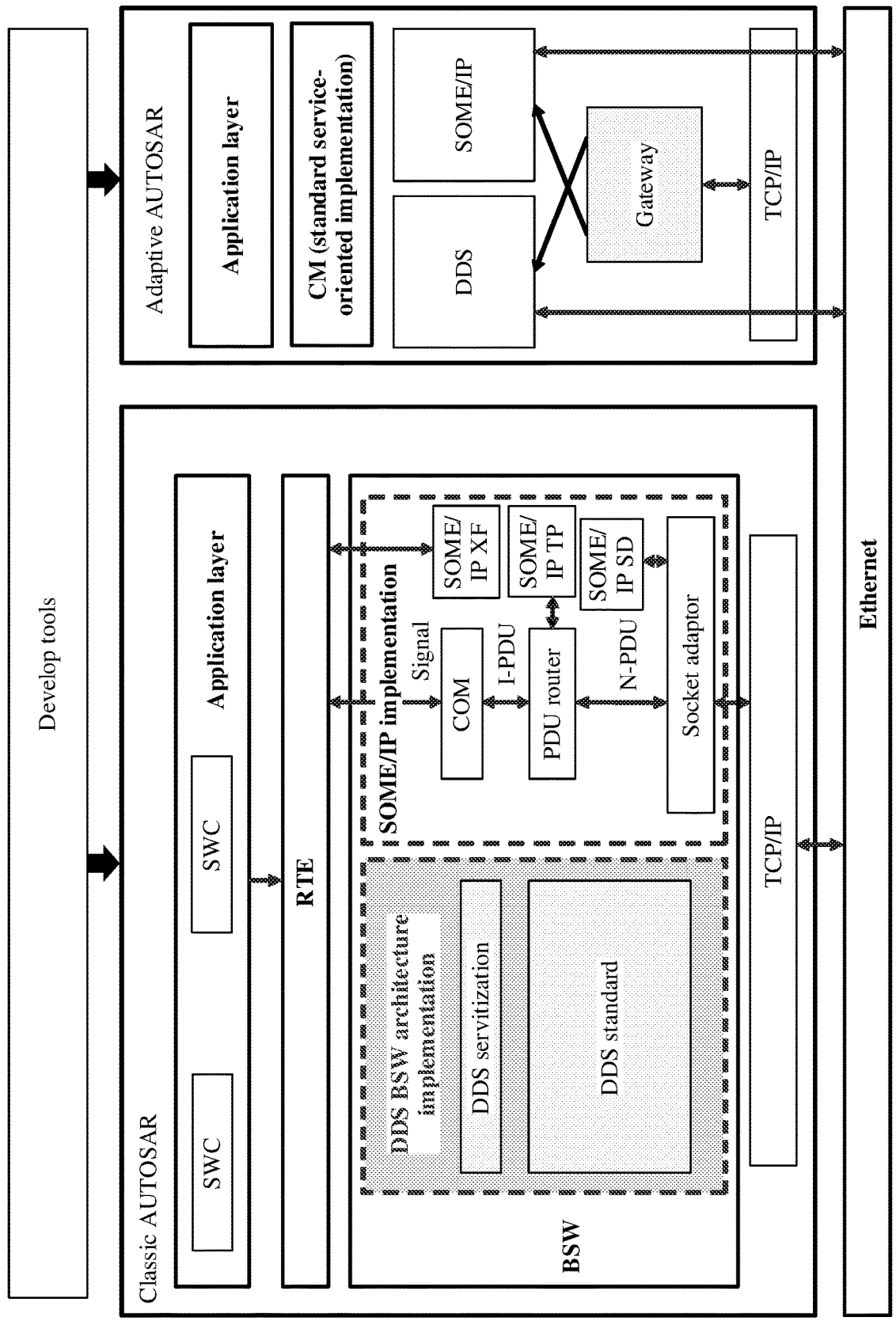
FIG. 13 is a schematic diagram of an overall architecture of a system according to an embodiment of this application.

Before a method for implementing DDS communication based on AUTOSAR provided in embodiments of this application is described, an overall architecture of this application is first described. Specifically, FIG. 13 is a schematic diagram of an overall architecture of a system according to an embodiment of this application. A gray box is a part different from an existing system architecture, and the difference is mainly as follows: (1) In this application, a DDS function is implemented at a BSW layer, and is parallel to a SOME/IP path. In addition, the DDS function is compatible with an RTE upward, and interacts with TCP/IP downward, so that implementation of an entire protocol stack is simplified, a software process is reduced as much as possible, and a transmission delay is reduced. In addition, a service-oriented capability is implemented. (2) A multi-protocol interworking gateway is deployed on a device to implement interworking between different communication protocols (that is, the SOME/IP protocol and the DDS protocol). In addition, in a tool chain (which may also be referred to as a tool system), functions are added to an original tool chain, so that a tool supports DDS.

Figure 14:
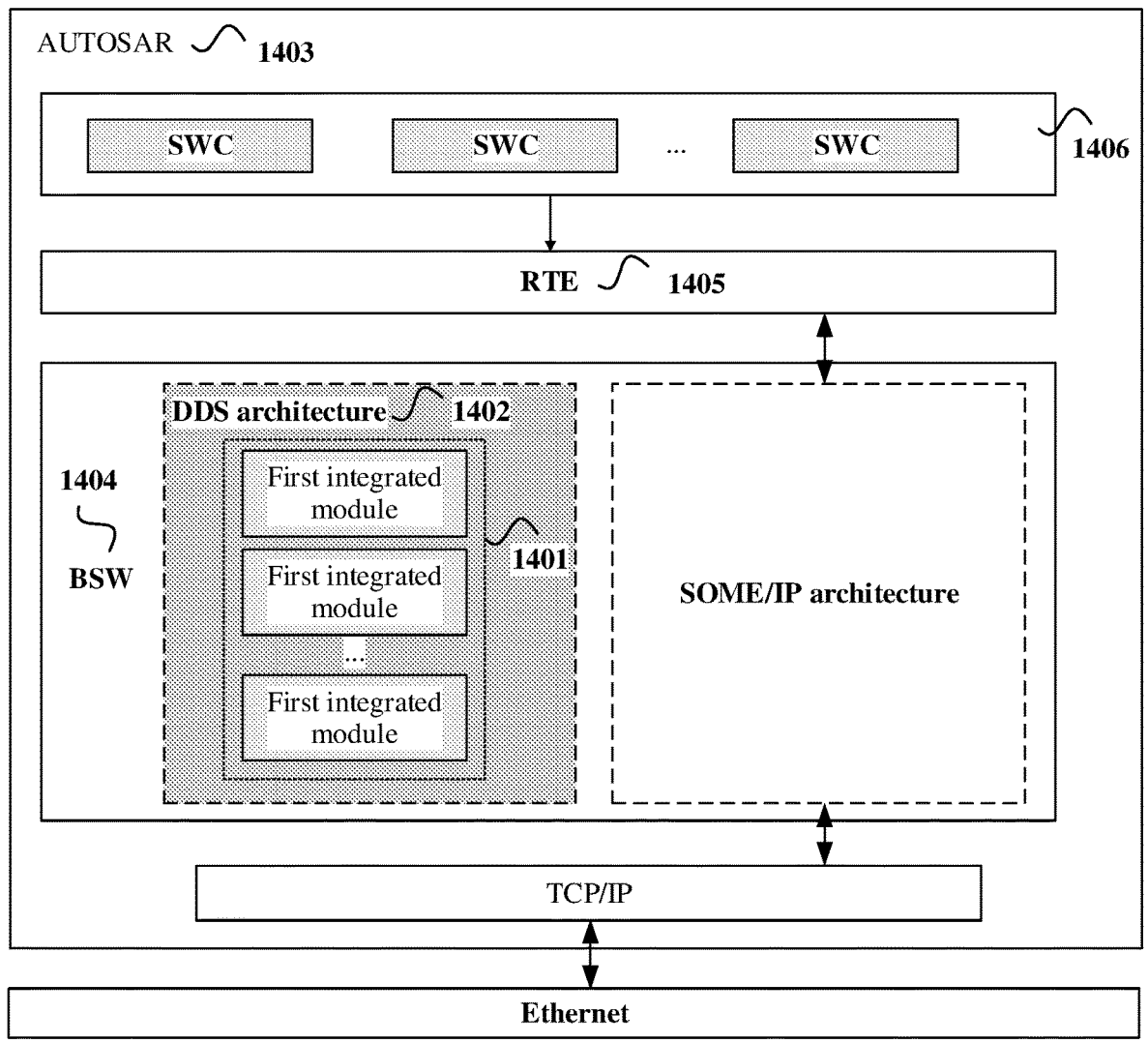
FIG. 14 is a schematic diagram of a system architecture according to an embodiment of this application.

Based on the overall architecture described in FIG. 13, the following describes in detail a system architecture provided in an embodiment of this application. Specifically, FIG. 14 is a schematic diagram of a system architecture according to an embodiment of this application. The system architecture includes: at least one first integrated module 1401, a DDS architecture 1402, and an AUTOSAR 1403, where the first integrated module 1401 is constructed in the DDS architecture 1402, and the DDS architecture 1402 is deployed in BSW 1404 in the AUTOSAR 1403. In addition, the AUTOSAR 1403 further includes an RTE 1405 and at least one SWC 1406. The first integrated module 1401 is configured to manage a message publisher and/or a message subscriber, for example, configured to manage an automatic discovery process between the message publisher and the message subscriber. For another example, when pairing between one or more message publishers and one or more message subscribers is completed, the first integrated module 1401 manages data in the message publisher and/or the message subscriber. A specific management manner is not limited in this application. The RTE 1405 in the AUTOSAR 1403 is configured to store a mapping relationship between each first integrated module 1401 and a corresponding SWC signal. It should be noted that the SWC signal is a signal sent by the SWC 1406 to the RTE 1405 and provided for the DDS architecture 1402.

It should be noted herein that the first integrated module 1401 may be constructed in a participant (Participant) of the DDS architecture 1402, or the first integrated module 1401 is a module additionally constructed in the DDS architecture 1402. Specifically, constructing the first integrated module 1401 includes but is not limited to the following manners.

(1) The first integrated module 1401 is constructed in the participant (Participant) of the DDS architecture 1402.

Figure 16:
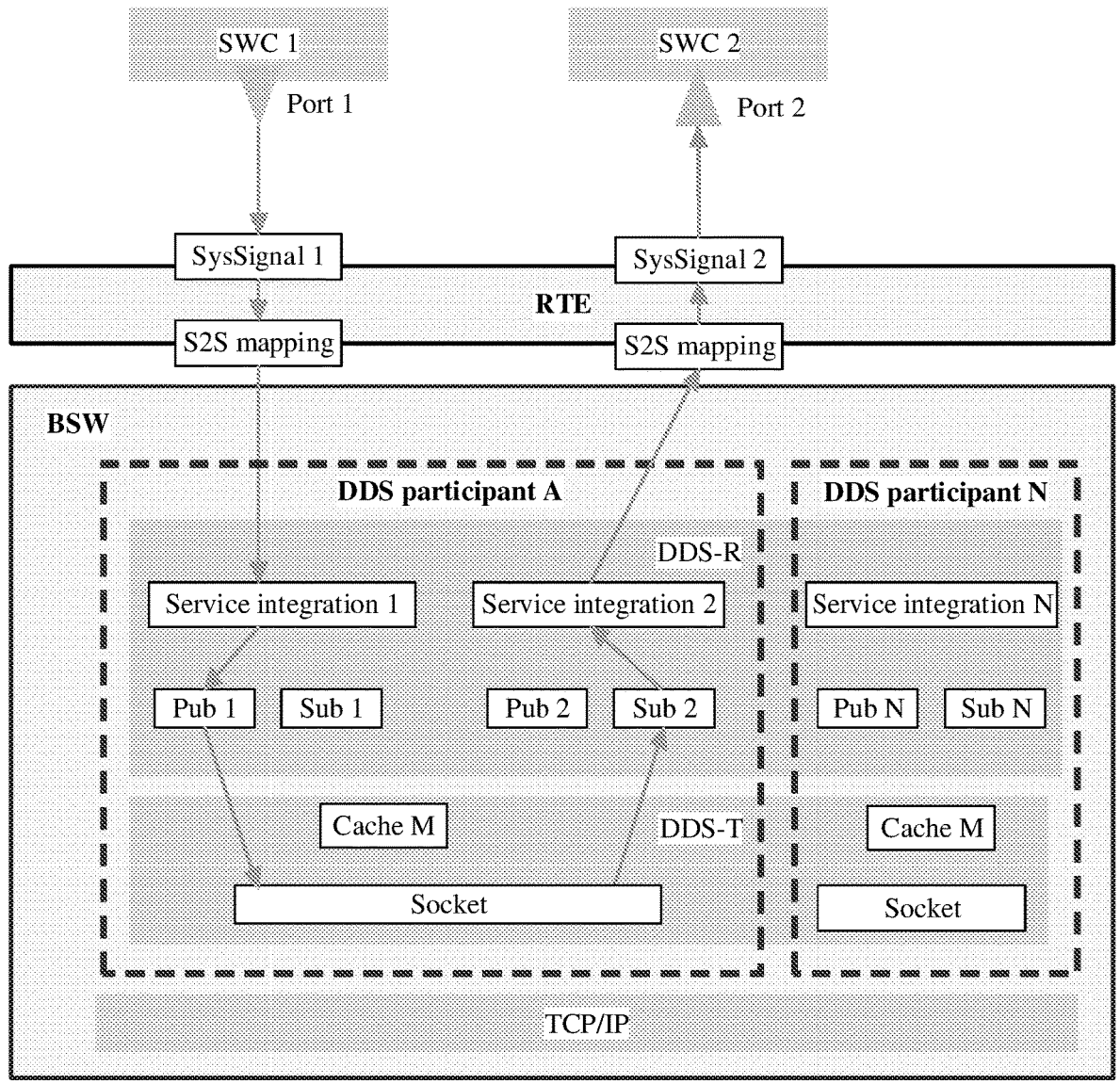
FIG. 16 is a schematic diagram of integrating a DDS into a BSW module of a CP according to an embodiment of this application.

In this case, the first integrated module 1401 is constructed in the participant (Participant) of the DDS architecture 1402, a quantity of participants is n, a quantity of first integrated modules 1401 is m, n≥1, and m≥1. As shown in FIG. 16, a DDS is integrated into a BSW module of CP, a DDS-R (which may not be further distinguished) implements a basic RTPS capability and interacts with an RTE upward, and a DDS-T (which may not be further distinguished) interacts with a network protocol stack downward and integrates a history cache capability. In service integration, a logical relationship between a publisher and a subscriber of the DDS is managed to implement service discovery and service communication capabilities of Event, Method, and Field. An S2S mapping function (signal-to-service) of the RTE integrates an SWC signal with a DDS service. In this way, the DDS provides a service capability and associates the SWC signal defined by the conventional CP with the DDS service, implementing a complete service-oriented communication path. It should be noted that, FIG. 16 shows that at least one first integrated module is deployed in each participant (that is, a participant A to a participant N). In some other embodiments, a quantity of first integrated modules may be less than a quantity of participants, that is, one first integrated module may correspond to at least one participant (a corresponding first integrated module may be deployed in any one of a plurality of participants served by the first integrated module). Alternatively, one first integrated module serves all participants (the first integrated module may be deployed in any one of a plurality of corresponding participants). This is not specifically limited herein.

(2) As an independent module, the first integrated module 1401 is additionally constructed in the DDS architecture 1402.

In this case, the first integrated module 1401 is used as an additional module (not shown in FIG. 14) and is constructed in the original DDS architecture 1402. An advantage of this deployment is that the original DDS architecture 1402 does not need to be changed.

It should be noted herein that, because the DDS architecture 1402 is deployed in the BSW 1404 in the AUTOSAR 1403, when the first integrated module 1401 is constructed in one or more participants of the DDS architecture 1402, each participant (that is, regardless of whether a first integrated module 1401 is deployed in the participant) in the DDS architecture 1402 is deployed in the BSW 1404 in the AUTOSAR 1403. For another example, when the first integrated module 1401 is an additional module constructed in the DDS architecture 1402, the first integrated module 1401 and each original participant in the DDS architecture 1402 are deployed in the BSW 1404 in the AUTOSAR 1403.

It should be noted that, in some implementations of this application, in addition to managing the automatic discovery process between the message publisher and the message subscriber, the first integrated module 1401 may also be configured to manage data between the message publisher and the message subscriber after the automatic discovery process ends. Details are separately described below.

(1) The first integrated module 1401 is configured to manage the automatic discovery process between the message publisher and the message subscriber.

Specifically, in this implementation, the first integrated module 1401 may be specifically configured to: determine a status of pairing between at least one message publisher and at least one message subscriber, for example, a status of pairing between m message publishers and n message subscribers, based on an automatic discovery mechanism of the DDS architecture 1402; and when pairing between the at least one message publisher and the at least one message subscriber is completed, for example, the m message publishers are paired with the n message subscribers, manage data in the at least one message publisher and/or the at least one message subscriber.

(2) The first integrated module 1401 is configured to manage the data between the message publisher and the message subscriber after the automatic discovery process ends.

Specifically, for response/request-based sent data of the SWC, an implementation may be as follows: The first integrated module 1401 is specifically configured to: first obtain a target SWC signal from the RTE 1405; then determine, based on the target SWC signal, a target message publisher corresponding to the target SWC signal, where the target message publisher is one of the at least one message publisher, for example, one of the m message publishers; and instruct the target message publisher to send first target data from a target SWC (that is, to-be-sent data of the target SWC) to a target message subscriber (that is, a receive end of the first target data). The target SWC is an SWC corresponding to the target SWC signal and is an SWC deployed on the AUTOSAR 1403. The target message subscriber is one of the at least one message subscriber, for example, one of the n message subscribers.

For response/request-based received data of the SWC, an implementation may be as follows: The first integrated module 1401 is further specifically configured to: receive a first instruction sent by a target message subscriber, where the first instruction represents that the target message subscriber has obtained second target data sent by a target message publisher (that is, a data transmit end), the target message publisher is one of the at least one message publisher, for example, one of the m message publishers, and the target message subscriber is one of the at least one message subscriber, for example, one of the n message subscribers; and then instruct, based on the first instruction, the RTE 1405 to obtain the second target data, for the target SWC to use the second target data on the RTE 1405. It should be noted herein that the second target data is not directly sent to the target SWC, but is received by the RTE 1405. When the target SWC needs to use the second target data, the second target data is used through calling.

It should be noted that, in some implementations of this application, the first integrated module 1401 may be further configured to: after obtaining the first instruction sent by the target message subscriber, store identification information of a message subscriber (for example, Sub3) corresponding to the target message publisher (for example, Pub3). The identification information may be an address of the message subscriber, or may be a field corresponding to the message subscriber, and any information that can uniquely identify the message subscriber may be referred to as the identification information in this application. A type of the identification information is not limited herein. Alternatively, the first integrated module 1401 may be further configured to send the identification information to the RTE 1405, and the RTE 1405 stores the identification information.

Figure 17:
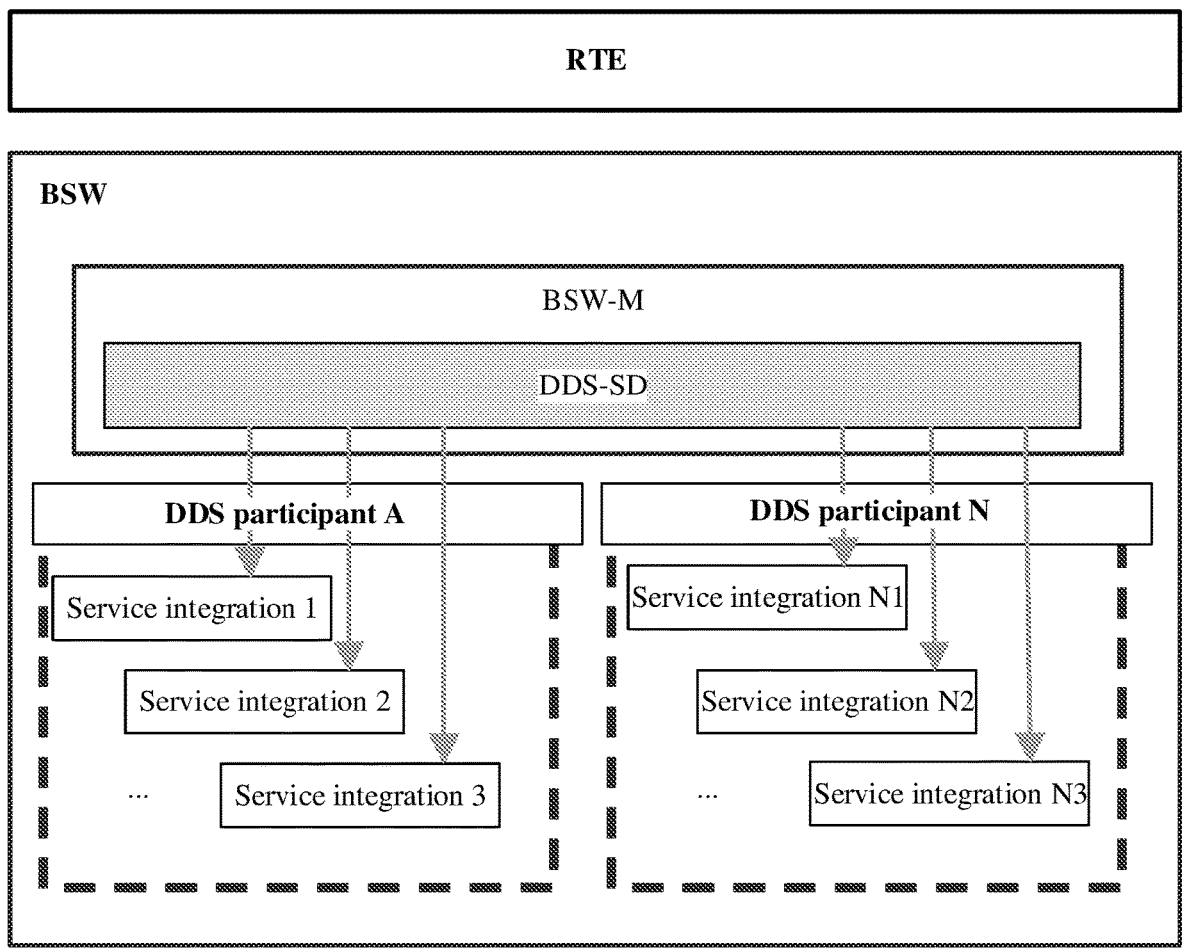
FIG. 17 is another schematic diagram of integrating a DDS into a BSW module of a CP according to an embodiment of this application.

It should be further noted that, in some implementations of this application, to resolve a service discovery problem, a target module may be further made, and the target module is embedded into a BSW-M (not shown in FIG. 14) in the BSW 1404. The target module is configured to manage an exchange process of a simple participant discovery protocol (simple participant discovery protocol, SPDP) message and/or a simple endpoint discovery protocol (simple endpoint discovery protocol, SEDP) message corresponding to each participant (for example, behavior and a parameter of each participant are managed in a unified manner). The exchange process is used to implement an automatic discovery mechanism of the DDS architecture 1402. As shown in FIG. 17, the target module is a DDS-SD module, and the DDS-SD module is embedded in a BSW-M for periodical calling or triggered calling by the BSW-M.

Figure 18:
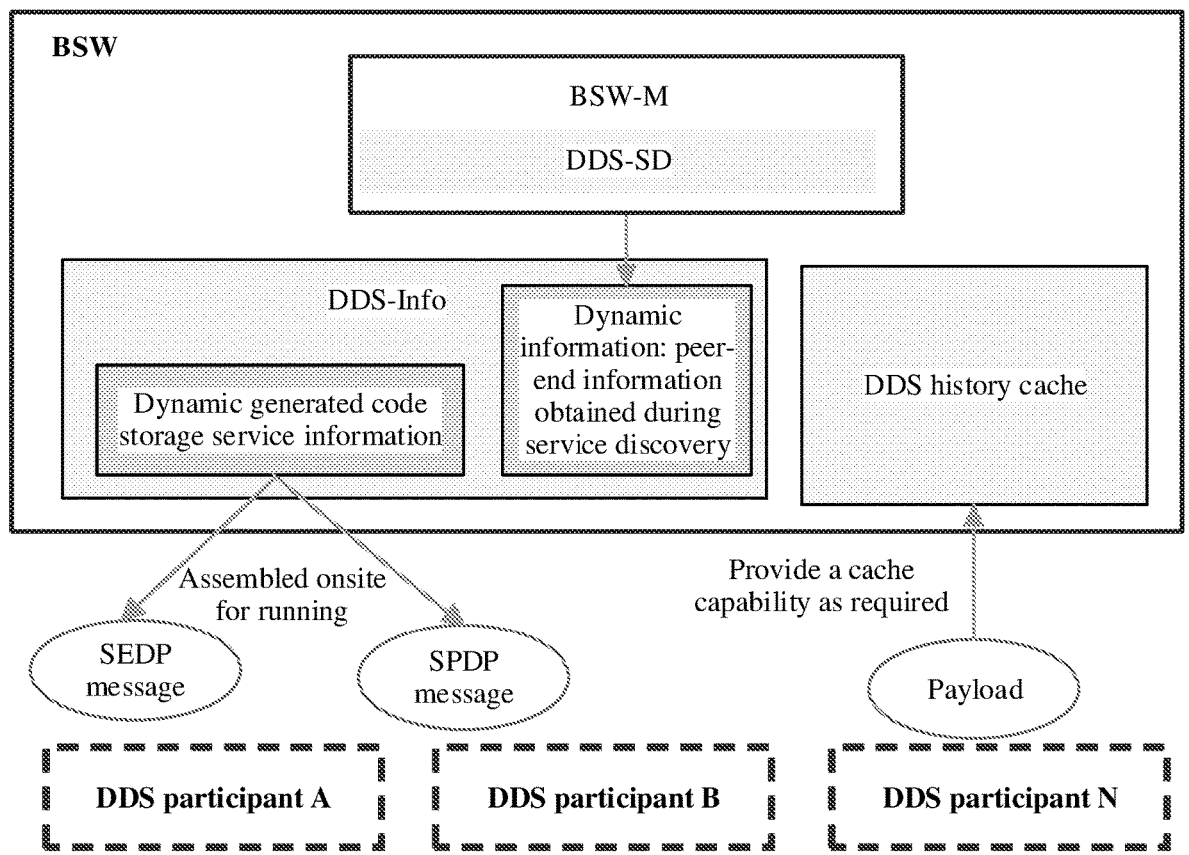
FIG. 18 is a schematic diagram of a runtime solution for reducing memory background noise according to an embodiment of this application.

It should be further noted that, in some other implementations of this application, to reduce memory background noise, the system architecture may further include a code generation module (not shown in FIG. 14), configured to generate a code snippet in advance from SPDP information and/or SEDP information corresponding to each participant, and when a first participant is in an automatic discovery process, assemble a code snippet corresponding to the first participant, to form SPDP information and/or SEDP information corresponding to the first participant. The first participant is one or more of the participants. For ease of understanding, the following provides an example for description. FIG. 18 is a schematic diagram of a runtime solution for reducing memory background noise according to an embodiment of this application. DDS-Info includes a dynamically generated code storage service message, that is, code generated in advance by an AUTOSAR configuration tool by using information required for service discovery, and the other part is dynamic information obtained during runtime. During service discovery, for SPDP messages and/or SEDP messages that need to be sent by some participants (for example, a DDS participant A and a DDS participant B in FIG. 18), the required information is first searched for in the code, and is assembled on site during running. An advantage is as follows: A CP device usually has a small memory, and this method of generating code in advance can save memory space and avoid using large memory stack space to store the SPDP messages and/or the SEDP messages for a long time.

It should be further noted that, in some other implementations of this application, the DDS-Info may further include dynamic information, that is, obtained SPDP information and/or SEDP information of a peer end of the first participant are/is stored in the dynamic information. It should be noted herein that the dynamic information is peer end information obtained by the participant during service discovery. For example, a first participant and a second participant perform service discovery, and the first participant sends an SPDP and an SEDP of the first participant to the second participant. For the second participant, such information is peer end information obtained in a service discovery phase, and the information may change with online/offline or a parameter change of the peer end, and therefore is referred to as dynamic information.

In addition, during running, for an application that has a DDS history cache requirement (which may be referred to as a first SWC, which is any one of SWCs deployed in the AUTOSAR), the application is allowed to occupy memory space to meet the DDS history cache requirement of the application. For an application that does not have a DDS history cache requirement, stack space is directly used to temporarily occupy memory. Code of running logic of this part is generated by the tool.

Specifically, the communication method provided in embodiments of this application relates to three parts of content: (1) Reconstruct CP basic software and integrate DDS into a CP stack. (2) Reconstruct a tool to integrate DDS. (3) Design a gateway to implement interworking between different protocols. The following separately describes the three parts of content.

1. Reconstruct CP Basic Software and Integrate DDS into a CP Stack.

Figure 15:
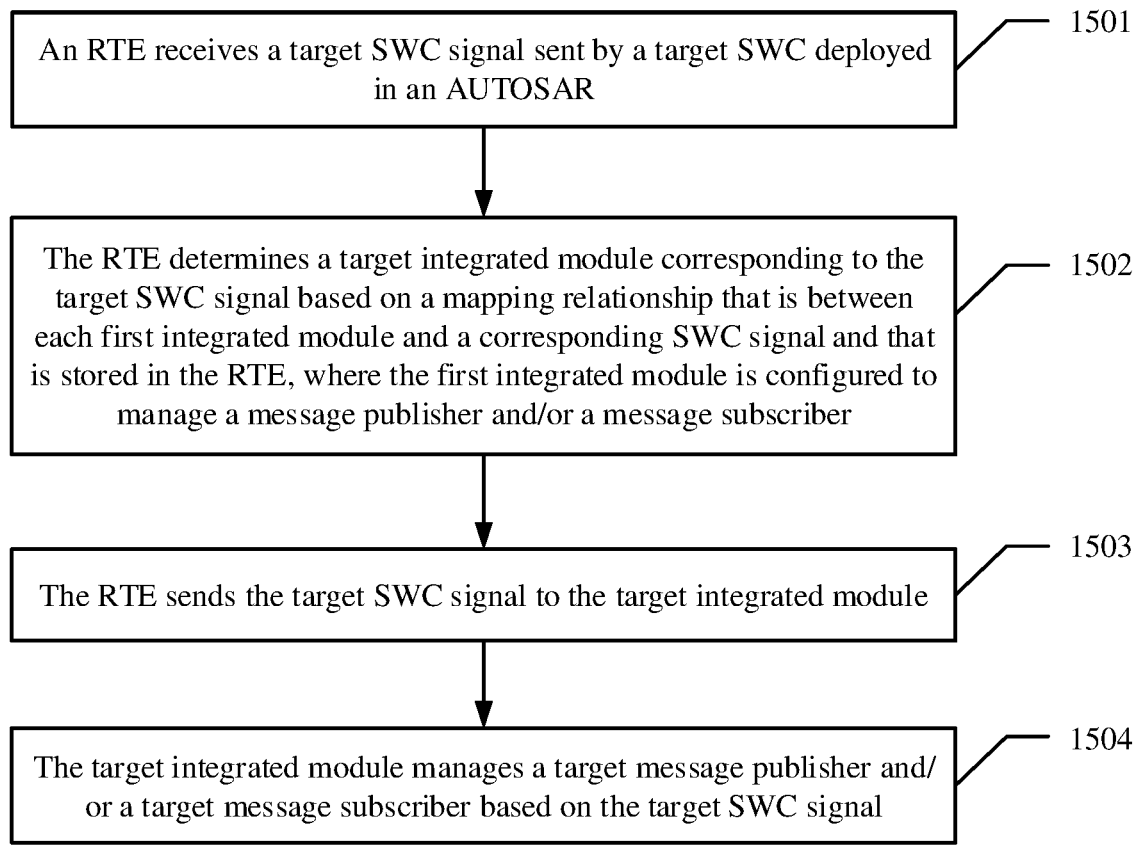
FIG. 15 is a schematic flowchart of a method for implementing DDS communication based on AUTOSAR according to an embodiment of this application.

Specifically, FIG. 15 is a schematic flowchart of a method for implementing DDS communication based on AUTOSAR according to an embodiment of this application. The method may be applied to the system architecture corresponding to FIG. 14. The system architecture includes at least one first integrated module, a DDS architecture, and an AUTOSAR. The first integrated module is built in the DDS architecture. The DDS architecture is deployed in BSW in the AUTOSAR. The AUTOSAR includes an RTE and an SWC. The method may specifically include the following steps.

1501: The RTE receives a target SWC signal sent by a target SWC deployed in the AUTOSAR.

First, the RTE receives the target SWC signal sent by the target SWC deployed in the AUTOSAR, and the target SWC signal is a signal sent by the target SWC to the RTE and provided for the DDS architecture.

1502: The RTE determines a target integrated module corresponding to the target SWC signal based on a mapping relationship that is between each first integrated module and a corresponding SWC signal and that is stored in the RTE, where the first integrated module is configured to manage a message publisher and/or a message subscriber.

After the RTE receives the target SWC signal sent by the target SWC deployed in the AUTOSAR, the RTE determines the target integrated module corresponding to the target SWC signal based on the mapping relationship that is between each first integrated module and a corresponding SWC signal and that is stored in the RTE, where the first integrated module is configured to manage the message publisher and/or the message subscriber. For example, the first integrated module is configured to manage an automatic discovery process between the message publisher and the message subscriber. For another example, when pairing between one or more message publishers and one or more message subscribers is completed, the first integrated module is configured to manage data in the message publisher and/or the message subscriber. A specific management manner is not limited in this application.

It should be noted that, in some implementations of this application, the first integrated module may be configured to manage the automatic discovery process between the message publisher and the message subscriber. An implementation process may be: determining a status of pairing between at least one message publisher and at least one message subscriber, for example, a status of pairing between m message publishers and n message subscribers, based on an automatic discovery mechanism of the DDS architecture; and when pairing between the at least one message publisher and the at least one message subscriber is completed, for example, the m message publishers are paired with the n message subscribers, managing data in the at least one message publisher and/or the at least one message subscriber.

In the foregoing implementations of this application, how the first integrated module is configured to manage the automatic discovery process between the message subscriber and the message publisher is specifically described, and this is implementable.

1503: The RTE sends the target SWC signal to the target integrated module.

After determining the target integrated module corresponding to the target SWC signal based on the mapping relationship that is between each first integrated module and a corresponding SWC signal and that is stored in the RTE, the RTE sends the target SWC signal to the target integrated module.

1504: The target integrated module manages a target message publisher and/or a target message subscriber based on the target SWC signal.

After the target integrated module receives the target SWC signal sent by the RTE, the target integrated module manages the target message publisher and/or the target message subscriber based on the target SWC signal.

It should be noted that, in some implementations of this application, that the target integrated module manages the target message publisher and/or the target message subscriber based on the target SWC signal may be managing response/request-based sent data of the target SWC. A specific implementation may be as follows: The target integrated module determines, based on the target SWC signal, the target message publisher corresponding to the target SWC signal. The target message publisher is one of the at least one message publisher, for example, one of the m message publishers. Then, the target integrated module instructs the target message publisher to send first target data from the target SWC (that is, to-be-sent data of the target SWC) to the target message subscriber (that is, a receive end of the first target data). The target SWC is an SWC corresponding to the target SWC signal and is an SWC deployed on the AUTOSAR. The target message subscriber is one of the at least one message subscriber, for example, one of the n message subscribers.

It should be further noted that, in some other implementations of this application, the target integrated module may further manage the target message publisher and/or the target message subscriber for response/request-based received data of the SWC. A specific implementation may be as follows: The target integrated module receives a first instruction sent by the target message subscriber, where the first instruction represents that the target message subscriber has obtained second target data sent by the target message publisher (that is, a data transmit end), the target message publisher is one of the at least one message publisher, for example, one of the m message publishers, and the target message subscriber is one of the at least one message subscriber, for example, one of the n message subscribers. Then, the target integrated module instructs, based on the first instruction, the RTE to obtain the second target data, for the target SWC to use the second target data on the RTE. It should be noted herein that the second target data is not directly sent to the target SWC, but is received by the RTE. When the target SWC needs to use the second target data, the second target data is used through calling.

It should be further noted that, in some other implementations of this application, after obtaining the first instruction sent by the target message subscriber, the target integrated module may store identification information of a message subscriber (for example, Sub3) corresponding to the target message publisher (for example, Pub3). The identification information may be an address of the message subscriber, or may be a field corresponding to the message subscriber, and any information that can uniquely identify the message subscriber may be referred to as the identification information in this application. A type of the identification information is not limited herein. Alternatively, after obtaining the first instruction sent by the target message subscriber, the target integrated module may send the identification information to the RTE, and the RTE stores the identification information. In an embodiment of this application, it is specifically described that when the target integrated module manages the response/request-based received data of the target SWC, the target integrated module may store the identification information of the message subscriber corresponding to the target message publisher, or send the identification information to the RTE, for the RTE to store the identification information. An objective of storing the identification information is that when the target SWC feeds back data, no pairing search is required, and a specific message subscriber with feedback to be sent to can be directly determined, thereby reducing a delay.

It should be further noted that, in some other implementations of this application, execution of the automatic discovery mechanism of the DDS architecture is triggered by a target module (for example, a DDS-SD module) embedded in a BSW management unit (BSW-M) in the BSW. The target module is configured to manage an exchange process of an SPDP message and/or an SEDP message corresponding to each participant (for example, uniformly manage behavior, a parameter, and the like of each participant). The exchange process is used to implement the automatic discovery mechanism of the DDS architecture. In an embodiment of this application, the target module is embedded to resolve a service discovery problem, and automatic discovery of the DDS architecture is implemented by using the embedded target module. This is implementable.

It should be further noted that, in some other implementations of this application, during running, if the target SWC has a DDS history cache requirement, the target SWC is allowed to meet the DDS history cache requirement of the target SWC by occupying memory space; or if the target SWC does not have a DDS history cache requirement, the target SWC is allowed to directly use stack space to temporarily occupy memory. Code of running logic of this part is generated by the tool.

2. Reconstruct a Tool to Integrate DDS.

Figure 19:
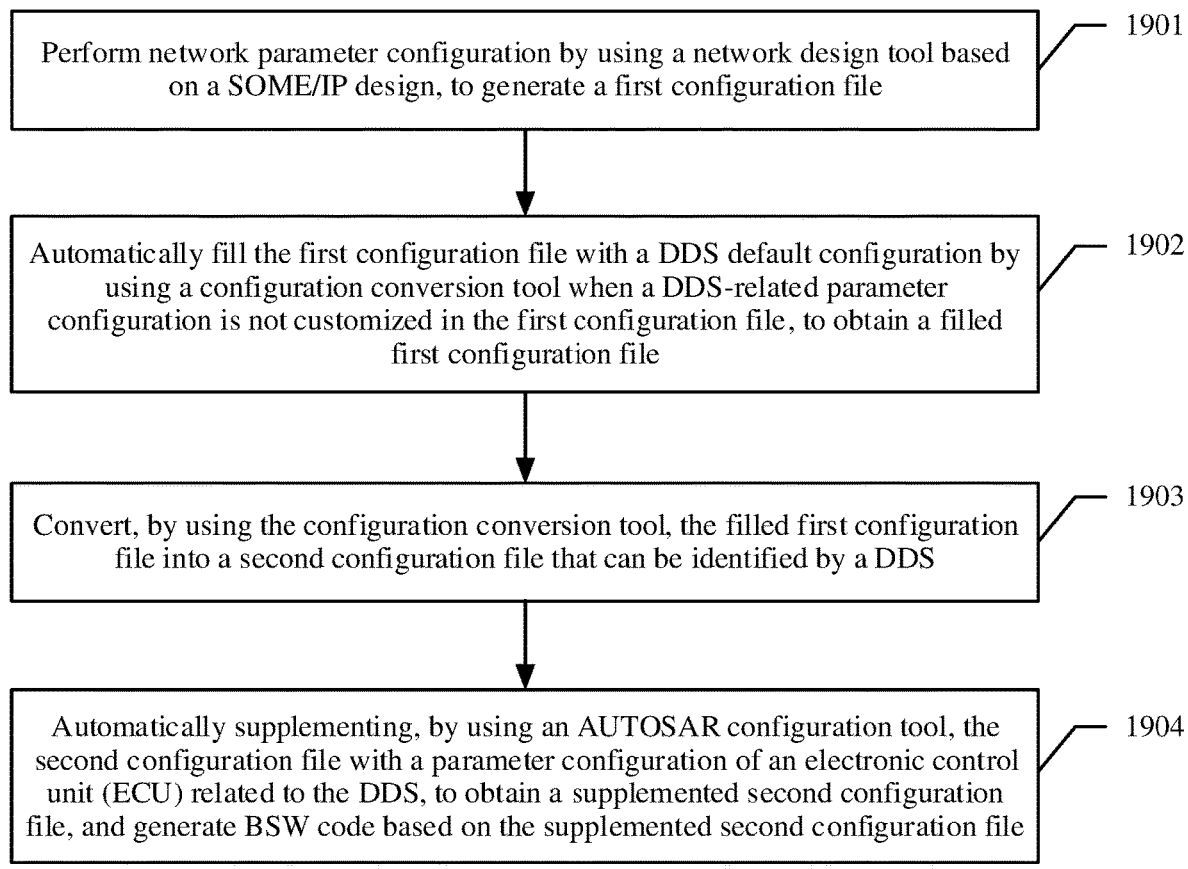
FIG. 19 is a schematic flowchart of a method for implementing DDS communication based on AUTOSAR according to an embodiment of this application.

For details, refer to FIG. 19. FIG. 19 is a schematic flowchart of a method for implementing DDS communication based on AUTOSAR according to an embodiment of this application. The method may specifically include the following steps.

1901: Perform network parameter configuration by using a network design tool based on a SOME/IP design, to generate a first configuration file.

In a network configuration tool, some configuration parameters related to communication by using SOME/IP exist, and network parameter configuration may be directly performed in an original manner (that is, based on the SOME/IP design), to generate the first configuration file. It should be noted that, in some embodiments of this application, the network design tool further additionally provides a DDS-related supplementary configuration, and a developer who understands DDS may perform customized network design. The network design tool finally generates the first configuration file for a configuration conversion tool to continue a design.

It should be noted that, compared with an existing network configuration tool, an option of the DDS-related supplementary configuration is added to the network configuration tool in embodiments of this application.

1902: Automatically fill the first configuration file with a DDS default configuration by using a configuration conversion tool when a DDS-related parameter configuration is not customized in the first configuration file, to obtain a filled first configuration file.

The first configuration file may be automatically filled with a DDS default configuration by using a configuration conversion tool when a DDS-related parameter configuration is not customized in the first configuration file, to obtain a filled first configuration file.

1903: Convert, by using the configuration conversion tool, the filled first configuration file into a second configuration file that can be identified by a DDS.

Then, the filled first configuration file is converted, by using the configuration conversion tool, into a second configuration file that can be identified by the DDS. To be specific, the configuration conversion tool converts a SOME/IP-related configuration into a DDS-related configuration. Related parameters of Event, Method, and Field of SOME/IP are correspondingly converted into a service integration parameter, a participant parameter, and the like of the DDS, a parameter like a port/signal of a CP is converted into a related parameter like DDS Pub/Sub/Topic, and various service IDs are converted into parameters such as a DDS topic name and service discovery-related QoS. In the configuration conversion tool, DDS-related supplementary configurations included in the network configuration tool and an AUTOSAR configuration tool are also considered. A plurality of default configurations (preconfigurations) are stored herein, and a default supplementary configuration is automatically filled based on a configuration in the network configuration tool. Filled parameters may include a DDS QoS parameter during running, a mapping relationship between an SWC signal in an RTE and a DDS, and the like.

It should be noted that the configuration conversion tool is proposed in embodiments of this application for the first time, and is used to convert a SOME/IP-related configuration into a DDS-related configuration, and automatically add a DDS default configuration. The configuration conversion tool does not exist in an existing solution.

1904: Automatically supplement, by using an AUTOSAR configuration tool, the second configuration file with a parameter configuration of an electronic control unit (ECU) related to the DDS, to obtain a supplemented second configuration file, and generate BSW code based on the supplemented second configuration file.

Finally, the second configuration file is automatically supplemented, by using the AUTOSAR configuration tool, with a parameter configuration of an ECU related to the DDS, to obtain a supplemented second configuration file, and BSW code is generated based on the supplemented second configuration file. It should be noted that the AUTOSAR configuration tool contains some DDS-related supplementary configurations, and the RTE performs interaction for a DDS supplementary rule and a BSW supplementary rule. Advanced developers can also perform customized modification.

It should be noted that, in an embodiment of this application, the BSW code is used to implement the communication method in the embodiment corresponding to FIG. 15.

Figure 20:
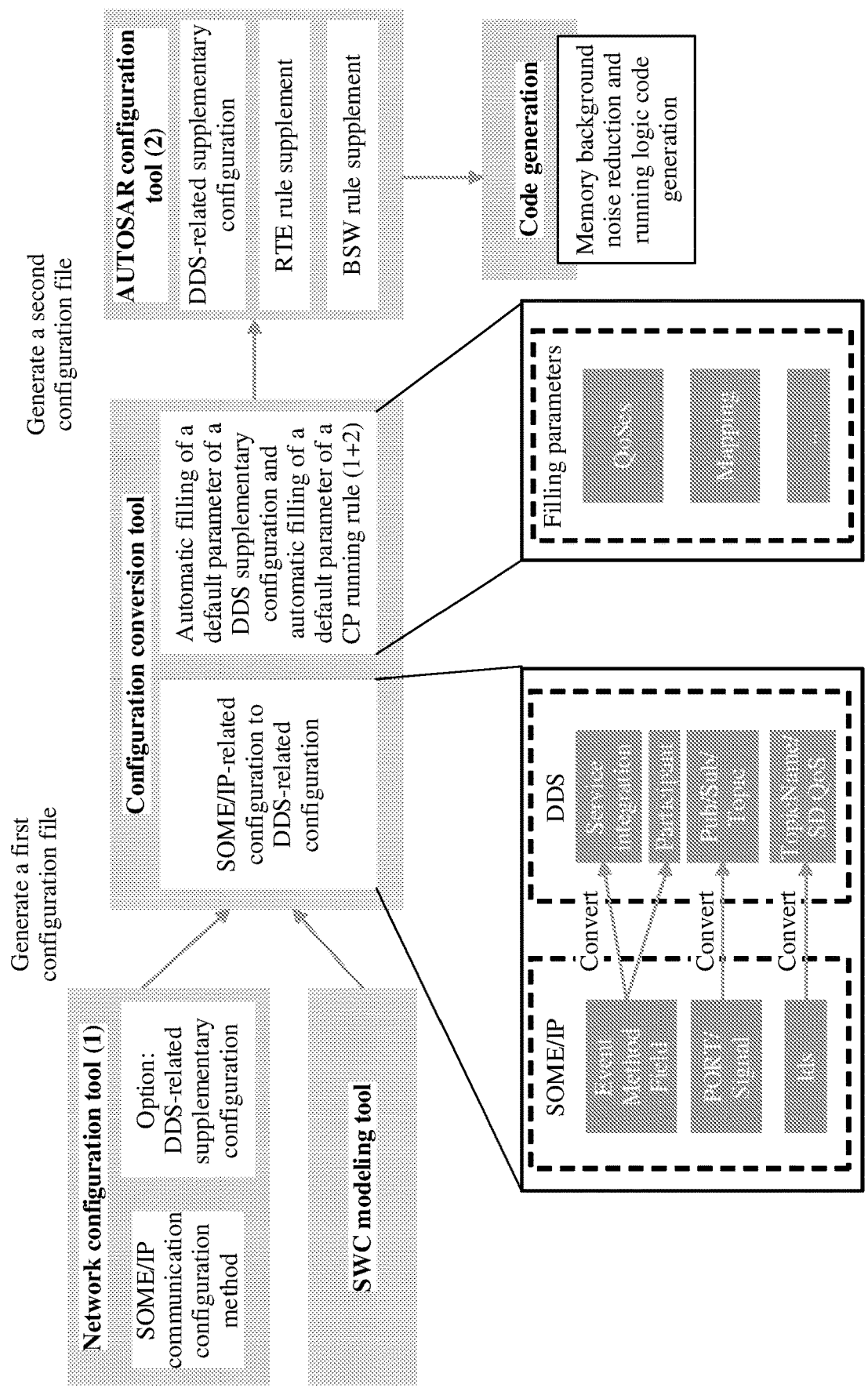
FIG. 20 is a schematic flowchart of a process of generating BSW code and SWC code according to an embodiment of this application.

It should be further noted that, in addition to generating the corresponding BSW code by using the network configuration tool, the configuration conversion tool, and the AUTOSAR configuration tool, SWC code further needs to be generated. Specifically, a function of an SWC may be designed by using an SWC modeling tool, to generate the SWC code. It should be noted herein that a process of generating the BSW code and a process of generating the SWC code may be performed in parallel; or the corresponding BSW code may be first generated by using the network configuration tool, the configuration conversion tool, and the AUTOSAR configuration tool, and then the SWC code is generated by using the SWC modeling tool; or the SWC code may be first generated by using the SWC modeling tool, and then the corresponding BSW code is generated by using the network configuration tool, the configuration conversion tool, and the AUTOSAR configuration tool. This is not specifically limited in this application. For a specific process of generating the BSW code and the SWC code, refer to a process shown in FIG. 20.

It should be further noted that, in some implementations of this application, after the BSW code and the SWC code are generated, the BSW code and the SWC code may be deployed on an ECU for running. A multi-protocol interworking apparatus (Gateway) is deployed on the ECU, and the gateway is configured to implement interworking between SOME/IP and DDS. The following third part describes how the gateway implements interworking between SOME/IP and DDS.

3. Design a Gateway to Implement Multi-Protocol Interworking.

For gateways, a conventional gateway runs receiving/sending instances of two protocols separately, an external transceiver node communicates with an instance in the gateway, and the two instances in the gateway perform format conversion and transfer on a message through an intermediate conversion apparatus. In this manner, a large quantity of instances run in a system, which severely affects running performance of the system. Different from that in the conventional solution, the gateway provided in an embodiment of this application does not run receiving and sending protocols of two protocols, but runs one instance. The instance monitors sending ports of all external applications, and performs message running control and message forwarding on a service discovery message and a user message. The gateway includes a message conversion module and a message control module. The message conversion module is configured to perform message format conversion between SOME/IP and DDS for a received message. The message control module is configured to convert a message receiving and sending process between SOME/IP and DDS based on content carried in the message.

It should be noted that, in some implementations of this application, a function of the gateway may also be implemented based on corresponding code generated by a configuration tool. Specifically, a design tool may be used to perform parameter configuration, generate a third configuration file, and then generate target code based on the third configuration file. The target code is used to implement the function of the gateway.

Figure 21:
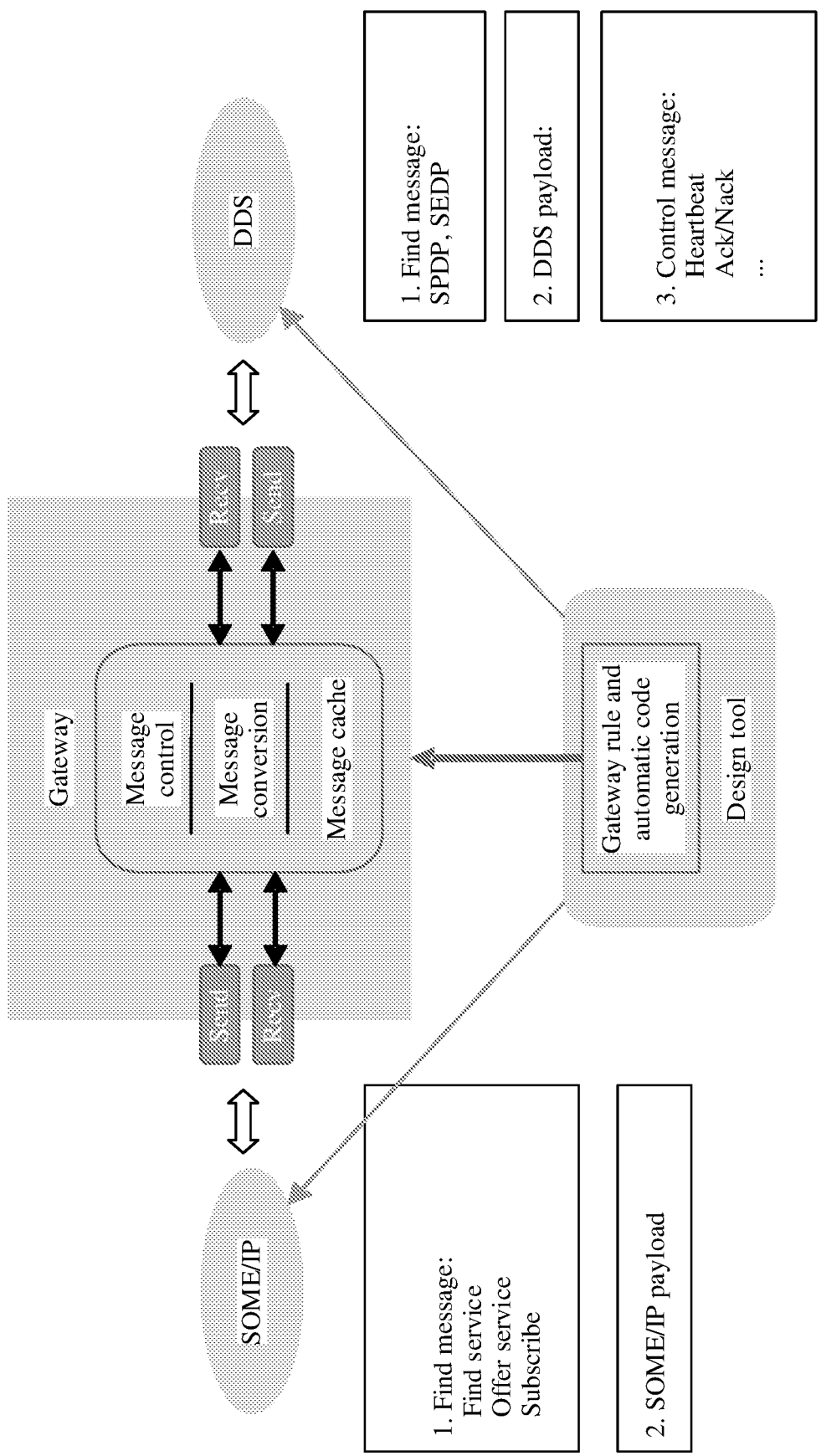
FIG. 21 is a schematic flowchart of a gateway implementation solution according to an embodiment of this application.

For ease of understanding, refer to FIG. 21. FIG. 21 is a schematic flowchart of an implementation solution of a gateway according to an embodiment of this application. The gateway has conventional message conversion logic, performs format conversion on a received message (Payload) to convert the message into a message format of another protocol, and forwards the message. The message control logic resolves a problem that SOME/IP and DDS have two different message sending and receiving processes. A message sending and receiving sequence and time are controlled, so that an application in each protocol does not perceive that a peer instance communicating with the application uses a different communication protocol. For example, a SOME/IP service discovery message includes messages such as a find service (Find Service), an offer service (Offer Service), subscribe (Subscribe), and a subscribe acknowledgement message (Subscribe ACK). A running sequence is as described in the embodiment corresponding to FIG. 4. Automatic discovery messages of DDS include an SPDP message and an SEDP message, and a running sequence is also as described in the embodiment corresponding to FIG. 4. The message control logic parses, integrates, and splits messages based on content of each message and content required by a protocol in each phase, and finally combines the messages into discovery messages that can be identified by a peer protocol. In addition, DDS has some control messages. The message control logic also controls these messages. A QoS mechanism of DDS has a requirement on message caching. Therefore, a cache capability is added to the gateway to be compatible with a DDS cache function. For the design tool, a gateway rule configuration capability and automatic code generation are added.

Figure 22:
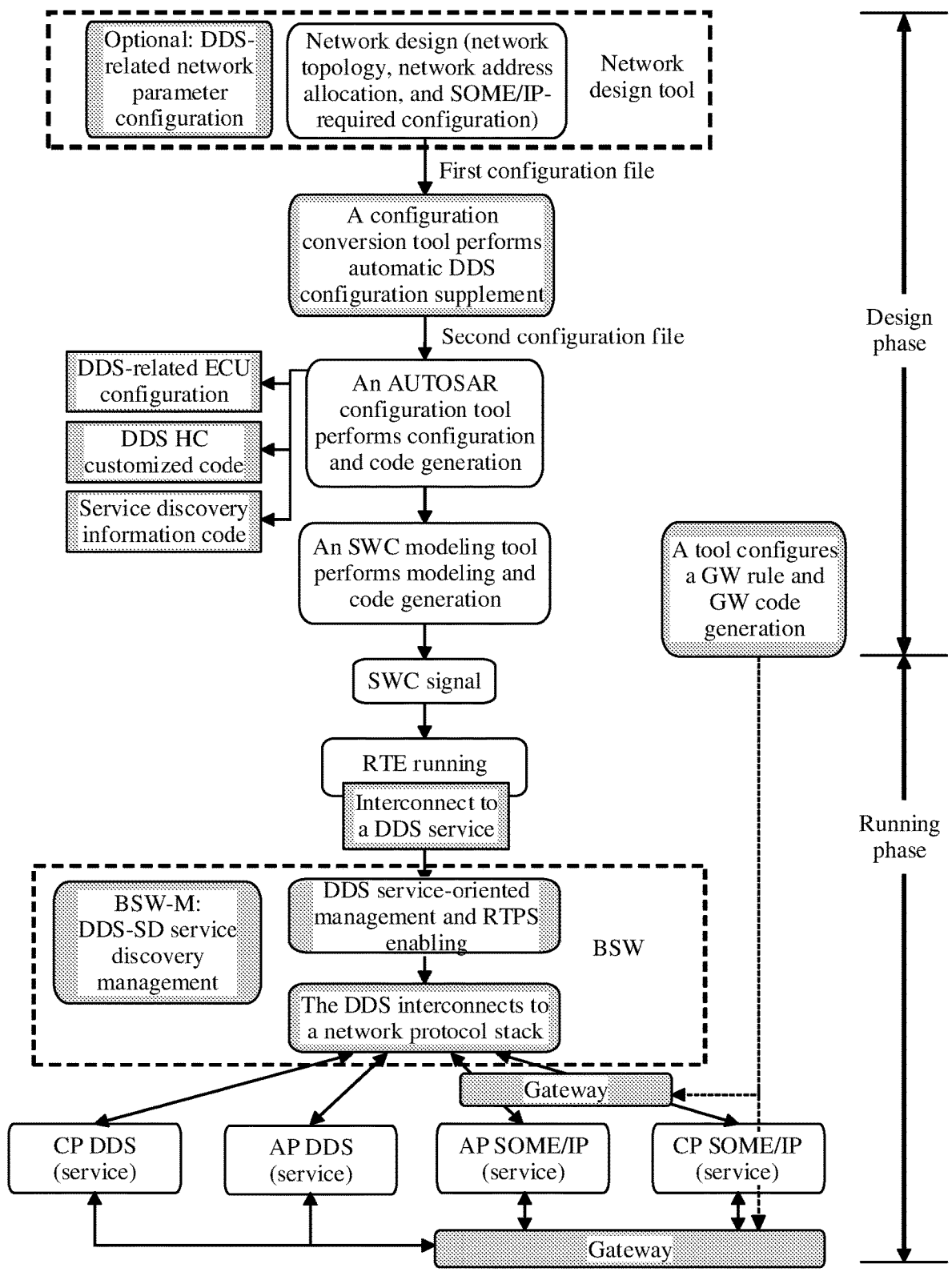
FIG. 22 is a schematic flowchart of code generation and code running according to an embodiment of this application.

The following describes, from an entire design phase and an entire running phase, a method for implementing DDS communication based on AUTOSAR and a software code generation method for implementing DDS communication based on AUTOSAR according to an embodiment of this application. For details, refer to FIG. 22. FIG. 22 is a schematic flowchart of code generation and code running according to an embodiment of this application. A gray process box indicates a difference from a CP standard specification.

(1) Design Phase

During network design, a developer may use an original SOME/IP-based design manner to configure a parameter. The developer does not need to pay attention to a DDS function. After a network configuration tool generates a configuration file, a configuration conversion tool (the configuration conversion tool is proposed in this application for the first time) converts the configuration file generated by the network configuration tool into a configuration file that can be identified by a DDS, and then sends the generated configuration file to an AUTOSAR configuration tool for further processing. In some implementations, the configuration conversion tool performs configuration supplement on a DDS-related parameter that is not covered by the network design tool, and also performs configuration supplement on a DDS-related ECU parameter that is not covered by the AUTOSAR configuration tool. The configuration conversion tool stores a series of default configurations (designed at the beginning). The configuration conversion tool selects an appropriate default configuration for supplement based on a communication mode configured in the network design tool. In this case, the developer does not need to understand DDS and only needs to perform design in an original manner. The network configuration tool, the configuration conversion tool, and the AUTOSAR configuration tool are used to generate underlying software code. An SWC configuration tool is used to generate SWC code. The generated SWC code determines, based on a requirement, whether to use a DDS channel of the underlying code or an original SOME/IP channel (that is, autonomous matching). An SWC modeling tool in FIG. 22 generates SWC code corresponding to only one SWC each time in a code generation process, and the underlying software code (that is, BSW code) is generated at a time.

Optionally, if the developer has a specific understanding on DDS, the developer may configure a parameter required by DDS in the network design tool, and then the configuration conversion tool is used to convert the parameter into an input configuration file of the AUTOSAR configuration tool. Then, the developer performs customized modification on a DDS-related ECU parameter configuration in the AUTOSAR configuration tool.

Modeling and code generation phases of the SWC modeling tool are the same as processes in the conventional specification. The developer does not need to perform a special operation.

To reduce memory background noise for DDS-based service implementation as much as possible, during code generation, the AUTOSAR configuration tool generates code from information required for DDS service discovery in advance. In this way, during running, an automatic discovery data package of DDS is directly copied from the code and assembled onsite. For a history cache capability of DDS, the AUTOSAR configuration tool determines, based on a communication requirement, whether each communication link requires the history cache, and then customizes the code.

(2) Running Phase

An SWC may directly transmit a communication signal (that is, an SWC signal) to an RTE. During BSW DDS implementation, a module is responsible for service-oriented management. Therefore, the RTE maps the SWC signal to a service-oriented management module of DDS (after obtaining the SWC signal, the RTE can autonomously determine whether to use a DDS channel or a SOME/IP channel). DDS directly interacts with a network protocol stack to send data (a receiving process is reverse). In addition, a BSW-M also manages and controls the DDS service discovery process.

If a communication protocol used by a peer end is different from the currently used communication protocol, the two protocols are connected through a gateway. In this way, multi-protocol interworking is implemented, and a device using DDS can use a service of a third-party device. For an internal rule of the gateway, the design tool performs setting and code generation.

Figure 23:
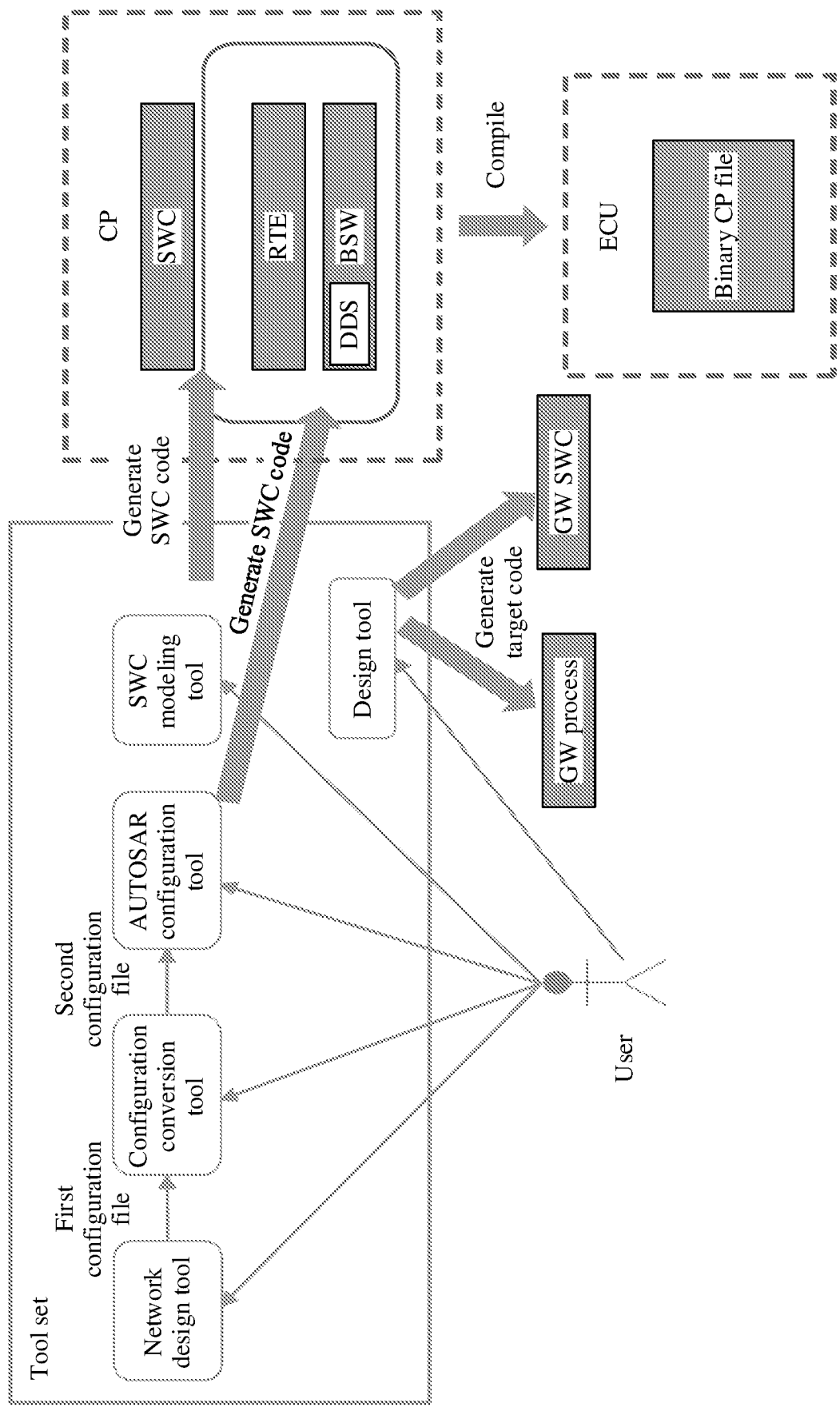
FIG. 23 is another schematic flowchart of a process of generating BSW code and SWC code according to an embodiment of this application.

A user first uses a tool to configure parameters, generate a configuration file, modify a configuration, and generate code (AUTOSAR code other than SWC code), and then designs an SWC and generates code. All code is compiled into a CP running file, and the compiled CP running file is deployed on an ECU. Similarly, the internal rule of the gateway is also set through the design tool, and finally code is generated. The user deploys the gateway on an AP device or a CP device. The gateway runs in process mode on the AP and in SWC mode on the CP. Details are shown in FIG. 23.

In conclusion, the method in the foregoing embodiments of this application deeply integrates DDS and a CP standard architecture. For a user, the SWC does not need to be modified, and a service-oriented communication capability is implemented, so that the CP and the AP implement complete service-oriented interworking, and memory background noise is reduced. In terms of tool usage, a designer does not need to understand DDS. In addition, an existing SWC and configuration file are designed based on SOME/IP, and can be quickly migrated to a new ecosystem. The implementation of the gateway enables the new architecture to be compatible with a service provided by a third-party device.

Figure 24:
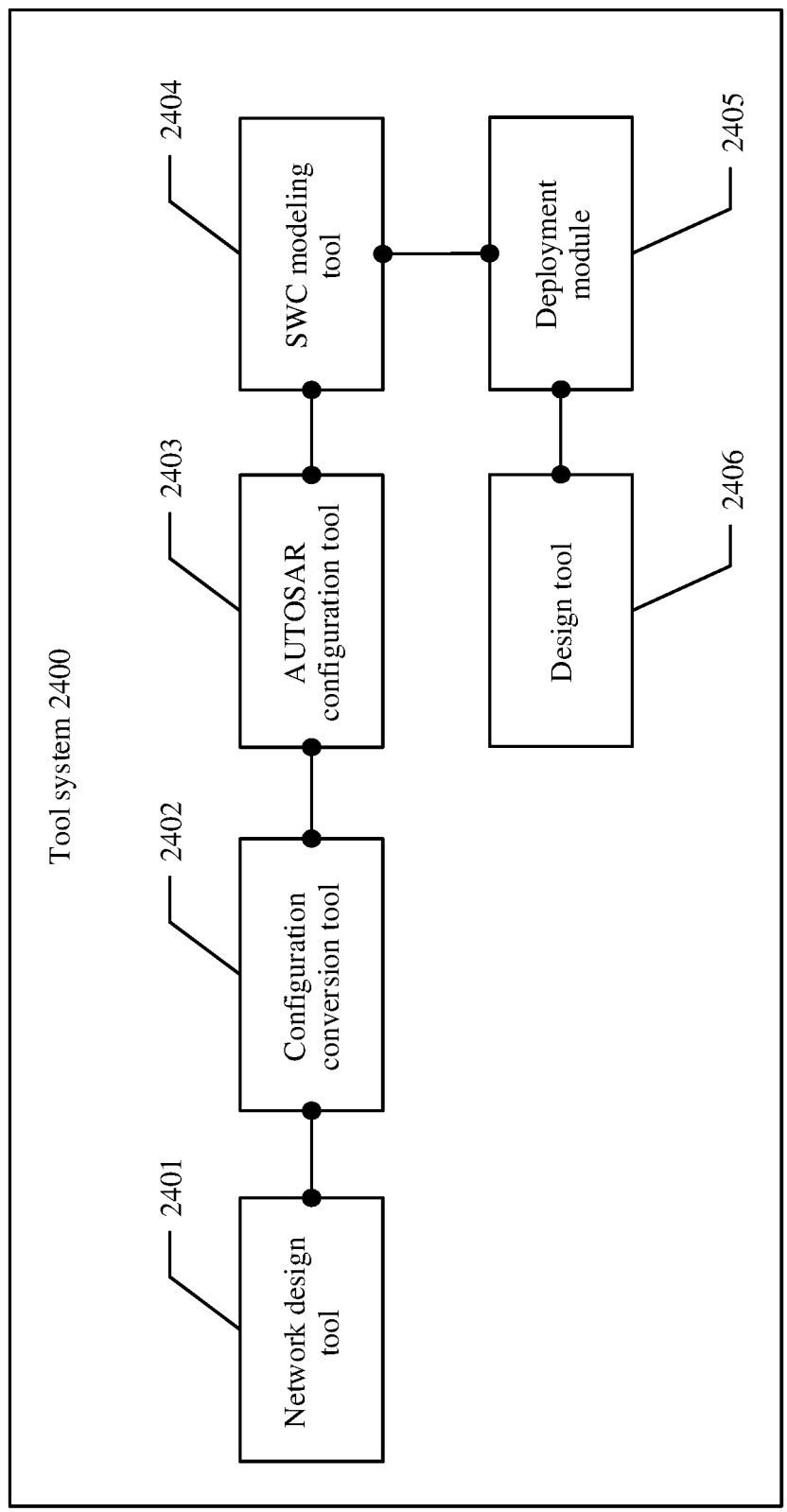
FIG. 24 is a schematic diagram of a structure of a tool system according to an embodiment of this application.

An embodiment of this application further provides a tool system. FIG. 24 is a schematic diagram of a structure of a tool system according to an embodiment of this application. The tool system 2400 includes a network design tool 2401, a configuration conversion tool 2402, and an AUTOSAR configuration tool 2403. The network design tool 2401 is configured to perform network parameter configuration based on a SOME/IP design, to generate a first configuration file. The configuration conversion tool 2402 is configured to automatically fill the first configuration file with a default configuration of a DDS when a parameter configuration related to the DDS is not customized in the first configuration file, to obtain a filled first configuration file. The configuration conversion tool 2402 is further configured to convert the filled first configuration file into a second configuration file that can be identified by the DDS. The AUTOSAR configuration tool 2403 is configured to: automatically supplement the second configuration file with a parameter configuration of an electronic control unit (ECU) related to the DDS, to obtain a supplemented second configuration file, and generate BSW code based on the supplemented second configuration file, where the BSW code is used to implement the communication method according to the embodiment corresponding to FIG. 15.

In a possible design, the tool system 2400 further includes an SWC modeling tool 2404, configured to design a function of an SWC, and generate SWC code.

In a possible design, the tool system 2400 further includes a deployment module 2405, configured to deploy the BSW code and the SWC code on an ECU for running, where a multi-protocol interworking apparatus (Gateway) is deployed on the ECU, and the gateway is configured to implement interworking between SOME/IP and the DDS.

In a possible design, the tool system 2400 further includes a design tool 2406, configured to: perform parameter configuration, and generate a third configuration file; and generate target code based on the third configuration file, where the target code is used to implement a function of the gateway.

It should be noted that content such as information exchange and an execution process between modules/units in the tool system 2400 is based on a same concept as the method embodiment corresponding to FIG. 19 in this application. For specific content, refer to the descriptions in the foregoing method embodiment of this application. Details are not described herein again.

Figure 25:
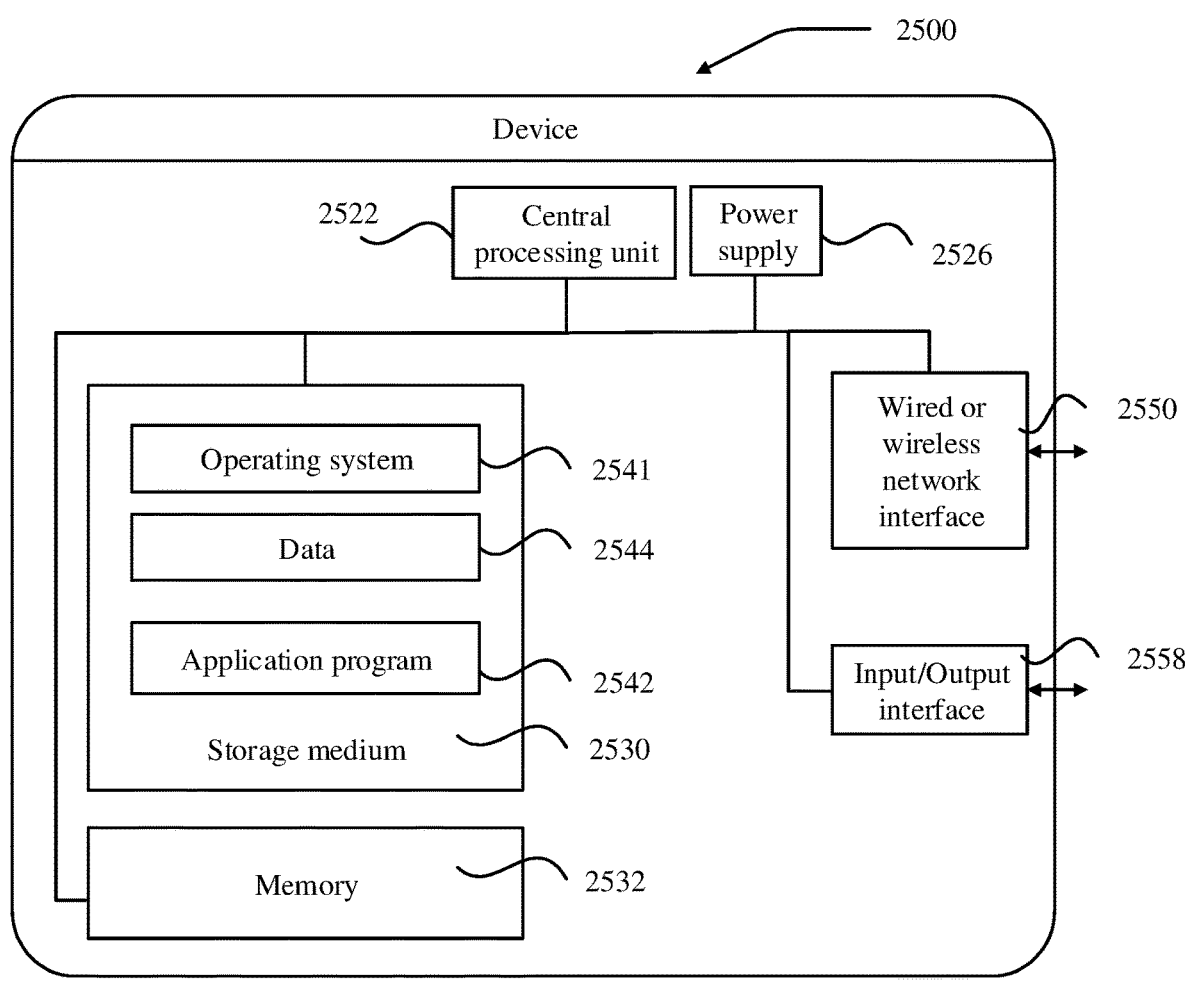
FIG. 25 is a schematic diagram of a structure of a device according to an embodiment of this application.

An embodiment of this application further provides a device. The device may be used as a computer device or a tool system. This is not specifically limited herein. FIG. 25 is a schematic diagram of a structure of a device according to an embodiment of this application. For ease of description, only a part related to embodiments of this application is shown. For specific technical details that are not disclosed, refer to the method part in embodiments of this application. When the device 2500 is used as a computer device, the module described in the embodiment corresponding to FIG. 14 may be deployed on the device 2500, and is configured to implement a function of the system architecture in the embodiment corresponding to FIG. 14. When the device 2500 is used as a tool system, the module described in the embodiment corresponding to FIG. 24 may be deployed on the device 2500, and is configured to implement a function of the tool system 2400 in the embodiment corresponding to FIG. 24. Specifically, the device 2500 is implemented by one or more servers. The device 2500 may vary greatly with a configuration or performance, and may include one or more central processing units (central processing units, CPU) 2522 (for example, one or more central processing units) and memories 2532, and one or more storage media 2530 (for example, one or more massive storage devices) for storing an application program 2542 or data 2544. The memory 2532 and the storage medium 2530 may be transitory storage or persistent storage. The program stored in the storage medium 2530 may include one or more modules (not shown in the figure), and each module may include a series of instruction operations for a training device. Further, the central processing unit 2522 may be configured to communicate with the storage medium 2530, and perform, on the device 2500, the series of instruction operations in the storage medium 2530.

The device 2500 may further include one or more power supplies 2526, one or more wired or wireless network interfaces 2550, one or more input/output interfaces 2558, and/or one or more operating systems 2541, such as Windows Server™, Mac OS X™, Unix™, Linux™, and FreeBSD™.

In an embodiment of this application, when the device 2500 is used as a computer device, the central processing unit 2522 is configured to perform the steps in the embodiment corresponding to FIG. 15. For example, the central processing unit 2522 may be configured to: first indicate an RTE to receive a target SWC signal sent by a target SWC deployed in an AUTOSAR, where the target SWC signal is a signal sent by the target SWC to the RTE and provided for a DDS architecture. Then, the central processing unit indicates the RTE to determine a target integrated module corresponding to the target SWC signal based on a mapping relationship that is between each first integrated module and a corresponding SWC signal and that is stored in the RTE. The first integrated module is configured to manage a message publisher and/or a message subscriber, for example, configured to manage an automatic discovery process between the message publisher and the message subscriber. For another example, when pairing between one or more message publishers and one or more message subscribers is completed, the first integrated module manages data in the message publisher and/or the message subscriber. A specific management manner is not limited in this application. Finally, the central processing unit indicates the RTE to send the target SWC signal to the target integrated module, and then indicates the target integrated module to manage a target message publisher and/or a target message subscriber based on the target SWC signal.

It should be noted that the central processing unit 2522 may be further configured to perform any step in the method embodiment corresponding to FIG. 15 in this application. For specific content, refer to the descriptions in the foregoing method embodiments of this application. Details are not described herein again.

In an embodiment of this application, when the device 2500 is used as a tool system, the central processing unit 2522 is configured to perform the steps in the embodiment corresponding to FIG. 19. For example, the central processing unit 2522 may be configured to perform network parameter configuration by using a network design tool based on a SOME/IP design, to generate a first configuration file. The first configuration file may be automatically filled with a DDS default configuration by using a configuration conversion tool when a DDS-related parameter configuration is not customized in the first configuration file, to obtain a filled first configuration file Then, the filled first configuration file is converted, by using the configuration conversion tool, into a second configuration file that can be identified by the DDS. To be specific, the configuration conversion tool converts a SOME/IP-related configuration into a DDS-related configuration. Related parameters of Event, Method, and Field of SOME/IP are correspondingly converted into a service integration parameter, a participant parameter, and the like of the DDS, a parameter like a port/signal of a CP is converted into a related parameter like DDS Pub/Sub/Topic, and various service IDs are converted into parameters such as a DDS topic name and service discovery-related QoS. In the configuration conversion tool, DDS-related supplementary configurations included in the network configuration tool and an AUTOSAR configuration tool are also considered. A plurality of default configurations (preconfigurations) are stored herein, and a default supplementary configuration is automatically filled based on a configuration in the network configuration tool. Filled parameters may include a DDS QoS parameter during running, a mapping relationship between an SWC signal in an RTE and a DDS, and the like.

It should be noted that the central processing unit 2522 may be further configured to perform any step in the method embodiment corresponding to FIG. 19 in this application. For specific content, refer to the descriptions in the foregoing method embodiments of this application. Details are not described herein again.

In addition, it should be noted that the described apparatus embodiment is merely an example. The units described as separate parts may or may not be physically separate, and parts displayed as units may or may not be physical units, may be located in one place, or may be distributed on a plurality of network units. Some or all of the modules may be selected according to an actual requirement to achieve the objectives of the solutions in the embodiments. In addition, in the accompanying drawings of the apparatus embodiments provided by this application, connection relationships between modules indicate that the modules have communication connections with each other, which may each be specifically implemented as one or more communication buses or signal cables.

Based on the description of the foregoing implementations, a person skilled in the art may clearly understand that this application may be implemented by using software in addition to necessary universal hardware, or by using dedicated hardware, including a dedicated integrated circuit, a dedicated CPU, a dedicated memory, a dedicated component, and the like. Generally, any function that is performed by a computer program can be easily implemented by using corresponding hardware. Moreover, a specific hardware structure used to implement a same function may be in various forms, for example, in a form of an analog circuit, a digital circuit, or a dedicated circuit. However, as for this application, a software program implementation is a better implementation in most cases. Based on such an understanding, the technical solutions of this application or the part contributing to the conventional technology may be implemented in a form of a software product. The computer software product is stored in a readable storage medium, like a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the method described in embodiments of this application.

All or some of the foregoing embodiments may be implemented by software, hardware, firmware, or any combination thereof. When software is used to implement the components, all or some of the components may be implemented in a form of a computer program product.

The computer program product includes one or more computer instructions. When the computer program instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, like a training device or a data center, integrating one or more usable media. The usable medium may be a magnetic medium (for example, a floppy disk, a hard disk, or a magnetic tape), an optical medium (for example, a DVD), a semiconductor medium (for example, a solid-state disk Solid State Disk (SSD)), or the like.

What is claimed is:

1. A system for implementing data distribution service (DDS) communication based on an automotive open system architecture (AUTOSAR), the system comprising:
    processing circuitry, comprising:
        the AUTOSAR, wherein the AUTOSAR comprises a runtime environment (RTE) and a software component (SWC);
        a data distribution service (DDS) architecture, wherein the DDS architecture is deployed in basic software (BSW) in the AUTOSAR; and
        a first integrated module, wherein the first integrated module is constructed in the DDS architecture and configured to manage a message publisher and/or a message subscriber,
    wherein the RTE is configured to store a mapping relationship between the first integrated module and a corresponding software component (SWC) signal, and
    wherein the SWC signal is a signal sent by the SWC to the RTE and provided for the DDS architecture.

2. The architecture according to claim 1, wherein the first integrated module is configured to:
    determine a status of pairing between at least one message publisher and at least one message subscriber based on an automatic discovery mechanism of the DDS architecture; and
    when pairing between the at least one message publisher and the at least one message subscriber is completed, manage data in the at least one message publisher and/or the at least one message subscriber.

3. The architecture according to claim 2, wherein the first integrated module is further configured to:
    obtain a target SWC signal from the RTE;
    determine, based on the target SWC signal, a target message publisher corresponding to the target SWC signal, wherein the target message publisher is one of the at least one message publisher; and
    instruct the target message publisher to send first target data from a target SWC to a target message subscriber, wherein the target SWC is an SWC corresponding to the target SWC signal, and wherein the target message subscriber is one of the at least one message subscriber.

4. The architecture according to claim 2, wherein the first integrated module is further configured to:
    receive a first instruction sent by a target message subscriber, the first instruction representing that the target message subscriber has obtained second target data sent by a target message publisher, the target message publisher is-being one of the at least one message publisher, and the target message subscriber is-being one of the at least one message subscriber; and
    instruct, based on the first instruction, the RTE to obtain the second target data, for a target SWC to use the second target data on the RTE.

5. The architecture according to claim 4, wherein the first integrated module is further configured to:

after obtaining the first instruction sent by the target message subscriber, store identification information of a message subscriber corresponding to the target message publisher; or send the identification information to the RTE, for the RTE to store the identification information.

6. The architecture according to claim 2, wherein the processing circuitry further comprises:

a target module embedded in a BSW management unit (BSW-M) in the BSW, the target module is-being configured to manage an exchange process of a simple participant discovery protocol (SPDP) message and/or a simple endpoint discovery protocol (SEDP) message corresponding to each participant, wherein the exchange process is used to implement the automatic discovery mechanism of the DDS architecture.

7. The architecture according to claim 6, wherein the processing circuitry further comprises:

a code generation module, configured to:
generate a code snippet from SPDP information and/or SEDP information corresponding to each participant, and
assemble, based on a first participant being in an automatic discovery process, a code snippet corresponding to the first participant, to form the SPDP information and/or SEDP information corresponding to the first participant.

8. The architecture according to claim 1, wherein when a first SWC has a DDS history cache requirement, the first SWC meets the DDS history cache requirement by occupying memory space, and the first SWC is deployed in the AUTOSAR.

9. The architecture according to claim 1, wherein a first SWC occupies memory space by using stack space based on the first SWC not having a DDS history cache requirement.

10. A method for implementing data distribution service (DDS) communication based on an automotive open system architecture (AUTOSAR), wherein the method is applied to a system architecture, wherein the system architecture comprises a first integrated module, a DDS architecture, and an AUTOSAR, the first integrated module being constructed in the DDS architecture, the DDS architecture being deployed in basic software (BSW) in the AUTOSAR, and the AUTOSAR comprising a runtime environment (RTE) and a software component (SWC), the method comprising:

receiving, by the RTE, a target SWC signal sent by a target SWC deployed in the AUTOSAR, wherein the target SWC signal is a signal sent by the target SWC to the RTE and provided for the data distribution service (DDS) architecture;

determining, by the RTE, a target integrated module corresponding to the target SWC signal based on a mapping relationship between at least the first integrated module and a corresponding SWC signal and that is stored in the RTE, wherein the first integrated module is configured to manage a message publisher and/or a message subscriber;

sending, by the RTE, the target SWC signal to the target integrated module; and managing, by the target integrated module, a target message publisher and/or a target message subscriber based on the target SWC signal.

11. The method according to claim 10, wherein the first integrated module is configured to manage the message publisher and/or the message subscriber by:

determining a status of pairing between at least one message publisher and at least one message subscriber based on an automatic discovery mechanism of the DDS architecture; and managing data in the at least one message publisher and/or the at least one message subscriber after pairing between the at least one message publisher and the at least one message subscriber is completed.

12. The method according to claim 11, wherein the managing, by the target integrated module, the target message publisher and/or the target message subscriber based on the target SWC signal comprises:

determining, by the target integrated module based on the target SWC signal, the target message publisher corresponding to the target SWC signal, wherein the target message publisher is one of the at least one message publisher; and instructing, by the target integrated module, the target message publisher to send first target data from the target SWC to the target message subscriber, wherein the target message subscriber is one of the at least one message subscriber.

13. The method according to claim 11, further comprising:

receiving, by the target integrated module, a first instruction sent by the target message subscriber, wherein the first instruction represents that the target message subscriber has obtained second target data sent by the target message publisher, the target message publisher is one of the at least one message publisher, and the target message subscriber is one of the at least one message subscriber; and instructing, by the target integrated module based on the first instruction, the RTE to obtain the second target data, for the target SWC to use the second target data on the RTE.

14. The method according to claim 13, wherein after the receiving, by the target integrated module, the first instruction sent by the target message subscriber, the method further comprises:

storing, by the target integrated module, identification information of a message subscriber corresponding to the target message publisher; or sending, by the target integrated module, the identification information to the RTE, for the RTE to store the identification information.

15. The method according to claim 11, wherein execution of the automatic discovery mechanism of the DDS architecture is triggered by a target module embedded in a BSW management unit (BSW-M) in the BSW, the target module is configured to manage an exchange process of a simple participant discovery protocol (SPDP) message and/or a simple endpoint discovery protocol (SEDP) message corresponding to each participant, and the exchange process is used to implement the automatic discovery mechanism of the DDS architecture.

16. The method according to claim 15, further comprising:

generating, by the system architecture, a code snippet from SPDP information and/or SEDP information corresponding to each participant; and assembling, by the system architecture based on a first participant being in an automatic discovery process, a code snippet corresponding to the first participant, to form SPDP information and/or SEDP information corresponding to the first participant.

17. The method according to claim 10, further comprising:
- based on the target SWC has a DDS history cache requirement, determining that the target SWC meets the DDS history cache requirement by occupying memory space.

18. The method according to claim 10, further comprising:
- based on the target SWC not have-having a DDS history cache requirement, determining that the target SWC occupies memory space by using stack space.

19. A method for implementing DDS communication based on AUTOSAR, comprising:
- performing network parameter configuration by using a network design tool based on a scalable service-oriented middleware over internet protocol (SOME/IP) design- to generate a first configuration file;
- automatically filling the first configuration file with a default configuration of a DDS by using a configuration conversion tool when a parameter configuration related to the DDS is not customized in the first configuration file, to obtain a filled first configuration file;
- converting, by using the configuration conversion tool, the filled first configuration file into a second configuration file that can be identified by the DDS; and
- automatically supplementing, by using an AUTOSAR configuration tool, the second configuration file with a parameter configuration of an electronic control unit (ECU) related to the DDS, to obtain a supplemented second configuration file, and generating BSW code based on the supplemented second configuration file, wherein the BSW code is used to implement the method according to claim 10.

20. The method according to claim 19, wherein the method further comprises:
- designing a function of an SWC by using an SWC modeling tool, and generating SWC code.

* * * * *